(12) United States Patent
Saavedra

(10) Patent No.: US 11,067,062 B2
(45) Date of Patent: Jul. 20, 2021

(54) APPARATUS AND METHOD FOR GENERATING ELECTRICITY

(71) Applicant: LOOK FOR THE POWER, LLC, Irmo, SC (US)

(72) Inventor: John A. Saavedra, Irmo, SC (US)

(73) Assignee: LOOK FOR THE POWER, LLC, Irmo, SC (US)

(*) Notice: Subject to any disclaimer, the term of this patent is extended or adjusted under 35 U.S.C. 154(b) by 0 days.

(21) Appl. No.: 17/013,238

(22) Filed: Sep. 4, 2020

(65) Prior Publication Data

US 2020/0400129 A1 Dec. 24, 2020

Related U.S. Application Data

(63) Continuation of application No. 15/046,609, filed on Feb. 18, 2016, now abandoned, which is a
(Continued)

(51) Int. Cl.
*F03G 3/00* (2006.01)
*F03B 13/14* (2006.01)
(Continued)

(52) U.S. Cl.
CPC ............... *F03G 3/00* (2013.01); *F03B 13/14* (2013.01); *F03G 3/08* (2013.01); *F15B 15/02* (2013.01); *Y02E 10/30* (2013.01)

(58) Field of Classification Search
CPC .... F03B 13/14; F03G 3/00; F03G 3/08; F15B 15/02; Y02E 10/30
See application file for complete search history.

(56) References Cited

U.S. PATENT DOCUMENTS

| 237,851 A | 2/1881 | Foskett |
| 1,786,472 A | 12/1930 | Yates |

(Continued)

FOREIGN PATENT DOCUMENTS

| EP | 1466090 | 3/2007 |
| EP | 2469073 | 6/2012 |

(Continued)

OTHER PUBLICATIONS

Cai, Li, Tang, Ayello, Richter, "Experimental study of water wetting in oil-water two phase flow—Horizontal flow of model oil", 2011, Chemical Engineering Science. (Year: 2011).*

*Primary Examiner* — Tulsidas C Patel
*Assistant Examiner* — Joseph Ortega
(74) *Attorney, Agent, or Firm* — Shumaker, Loop & Kendrick, LLP

(57) ABSTRACT

An apparatus for capturing energy of a working mass may include two or more immiscible liquids having different densities. The two immiscible liquids may include a predetermined proportion of oil and water. The apparatus may include a supporting structure, a hermetically sealed vessel, and an electric generator driven by fluid flow. The hermetically sealed vessel may have an elongate shape housing the working mass such that the working mass moves within the hermetically sealed vessel. An electric generator driven by fluid flow may be housed within the hermetically sealed vessel and having an inlet and an outlet. The electric generator driven by fluid flow may be configured to produce electric power as the predetermined portion of oil and water passes into the inlet and out of the outlet in response to a movement of the hermetically sealed vessel.

11 Claims, 24 Drawing Sheets

Related U.S. Application Data continuation-in-part of application No. 14/607,209, filed on Jan. 28, 2015, now Pat. No. 9,637,013, and a continuation-in-part of application No. 14/935,604, filed on Nov. 9, 2015, now abandoned, which is a continuation of application No. 14/468,489, filed on Aug. 26, 2014, now Pat. No. 9,212,653, which is a continuation-in-part of application No. 14/031,201, filed on Sep. 19, 2013, now Pat. No. 8,896,145, which is a continuation-in-part of application No. 13/678,770, filed on Nov. 16, 2012, now Pat. No. 8,742,614.

(60) Provisional application No. 62/120,063, filed on Feb. 24, 2015.

(51) Int. Cl.
*F03G 3/08* (2006.01)
*F15B 15/02* (2006.01)

(56) References Cited

U.S. PATENT DOCUMENTS

| | | | |
|---|---|---|---|
| 3,876,925 A | 4/1975 | Stockert | |
| 3,952,723 A | 4/1976 | Browning | |
| 3,995,972 A | 12/1976 | Nassar | |
| 4,295,538 A | 10/1981 | Lewus | |
| 4,359,867 A | 11/1982 | Swanson | |
| 4,392,061 A | 7/1983 | Dubois et al. | |
| 4,915,584 A | 4/1990 | Kashubara | |
| 5,009,571 A | 4/1991 | Smith | |
| 5,337,560 A | 8/1994 | Abdelmalek | |
| 5,570,286 A | 10/1996 | Margolis et al. | |
| 6,054,838 A | 4/2000 | Tsatsis | |
| 6,273,680 B1 | 8/2001 | Arnold | |
| 6,652,232 B2 | 11/2003 | Bolduc | |
| 7,023,104 B2 | 4/2006 | Kobashikawa et al. | |
| 7,131,269 B2 | 11/2006 | Koivusaari | |
| 7,728,455 B2 | 6/2010 | Branco | |
| 7,759,813 B2 | 7/2010 | Fujisato | |
| 7,964,984 B2 | 6/2011 | Saavedra | |
| 8,004,105 B2 | 8/2011 | Whittaker et al. | |
| 8,049,357 B2 | 11/2011 | Saavedra | |
| 8,113,193 B2 | 2/2012 | Glynn | |
| 8,278,776 B1 | 10/2012 | Arntz | |
| 8,319,366 B2 | 11/2012 | Andujar | |
| 8,654,512 B2 | 2/2014 | Van Straten | |
| 10,024,297 B2 | 7/2018 | Gerami | |
| 2005/0167988 A1 | 8/2005 | Wood | |
| 2006/0188364 A1 | 8/2006 | Fritz | |
| 2007/0089924 A1 | 4/2007 | de la Torre et al. | |
| 2008/0157537 A1 | 7/2008 | Richard | |
| 2009/0071734 A1 | 3/2009 | Hurkett | |
| 2009/0072539 A1 | 3/2009 | Turner | |
| 2009/0160192 A1 | 6/2009 | Chen | |
| 2009/0229902 A1 | 9/2009 | Stansbury, III | |
| 2009/0283659 A1 | 11/2009 | Newbill | |
| 2010/0006362 A1 | 1/2010 | Armstrong | |
| 2010/0072760 A1 | 3/2010 | Zackary et al. | |
| 2010/0133850 A1 | 6/2010 | Winkler | |
| 2010/0170497 A1 | 7/2010 | Glynn | |
| 2010/0170502 A1 | 7/2010 | Glynn | |
| 2011/0041499 A1 | 2/2011 | Godwin | |
| 2011/0095531 A1 | 4/2011 | Menges | |
| 2011/0169265 A1* | 7/2011 | Chen | F03B 7/00 290/53 |
| 2011/0198856 A1* | 8/2011 | Ling | F03D 9/25 290/55 |
| 2012/0235417 A1 | 9/2012 | Arntz | |
| 2012/0317971 A1 | 12/2012 | Jarman | |
| 2013/0000303 A1* | 1/2013 | Godwin | F01K 25/10 60/660 |
| 2013/0207398 A1 | 8/2013 | Jo | |
| 2013/0284273 A1 | 10/2013 | Boespflug | |
| 2014/0097621 A1 | 4/2014 | Kassianoff | |
| 2014/0232118 A1 | 8/2014 | Luigi | |
| 2015/0028596 A1 | 1/2015 | Hung | |

FOREIGN PATENT DOCUMENTS

| | | |
|---|---|---|
| WO | 01/25044 | 4/2001 |
| WO | 20120396688 | 3/2012 |

* cited by examiner

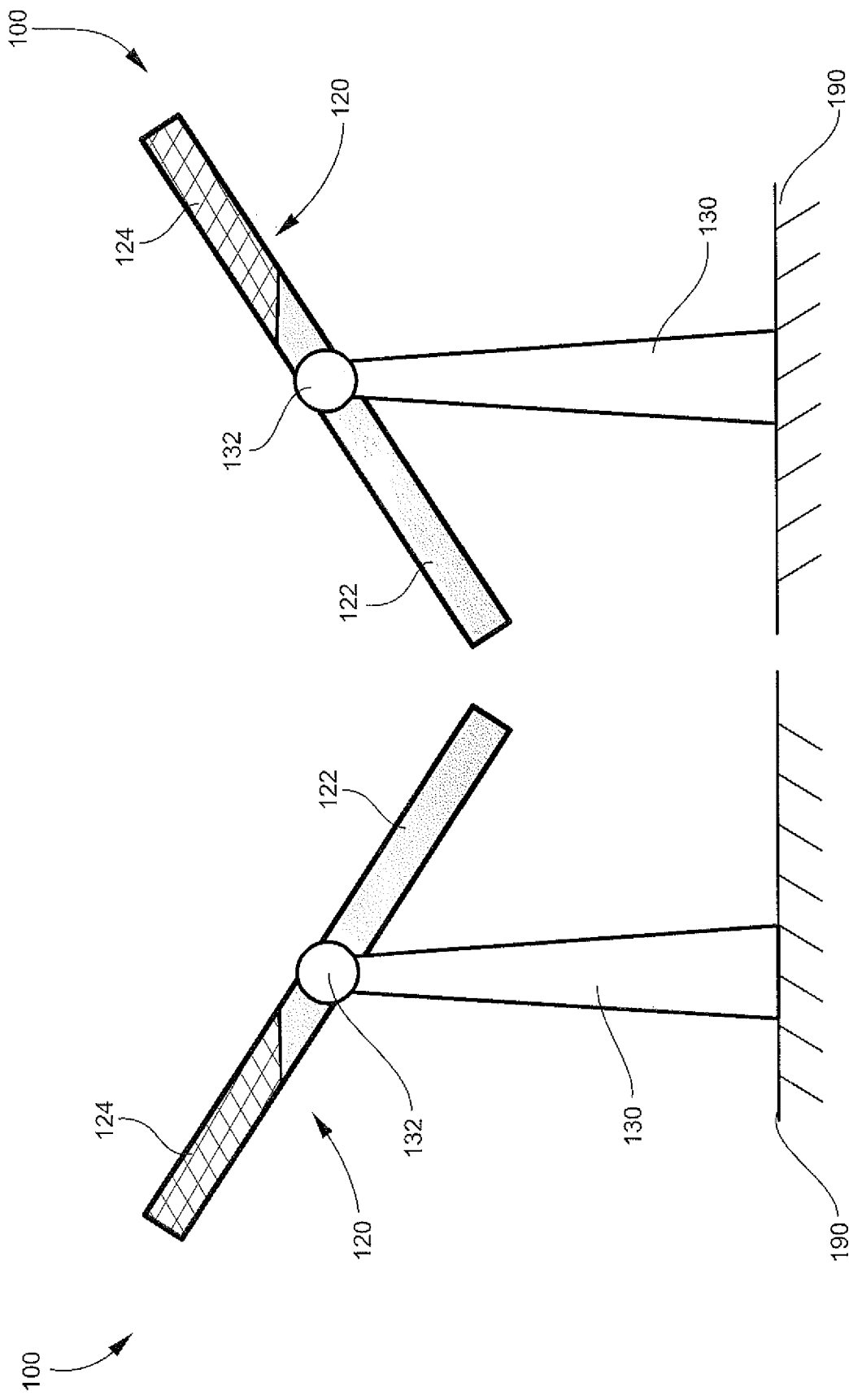

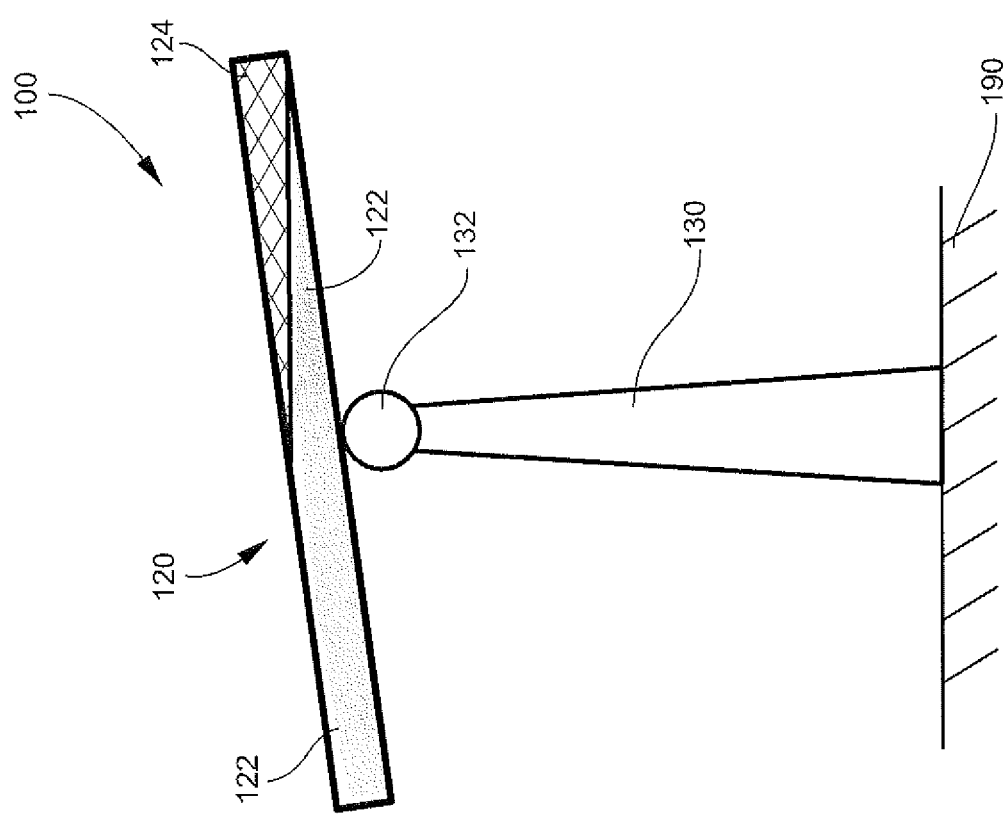
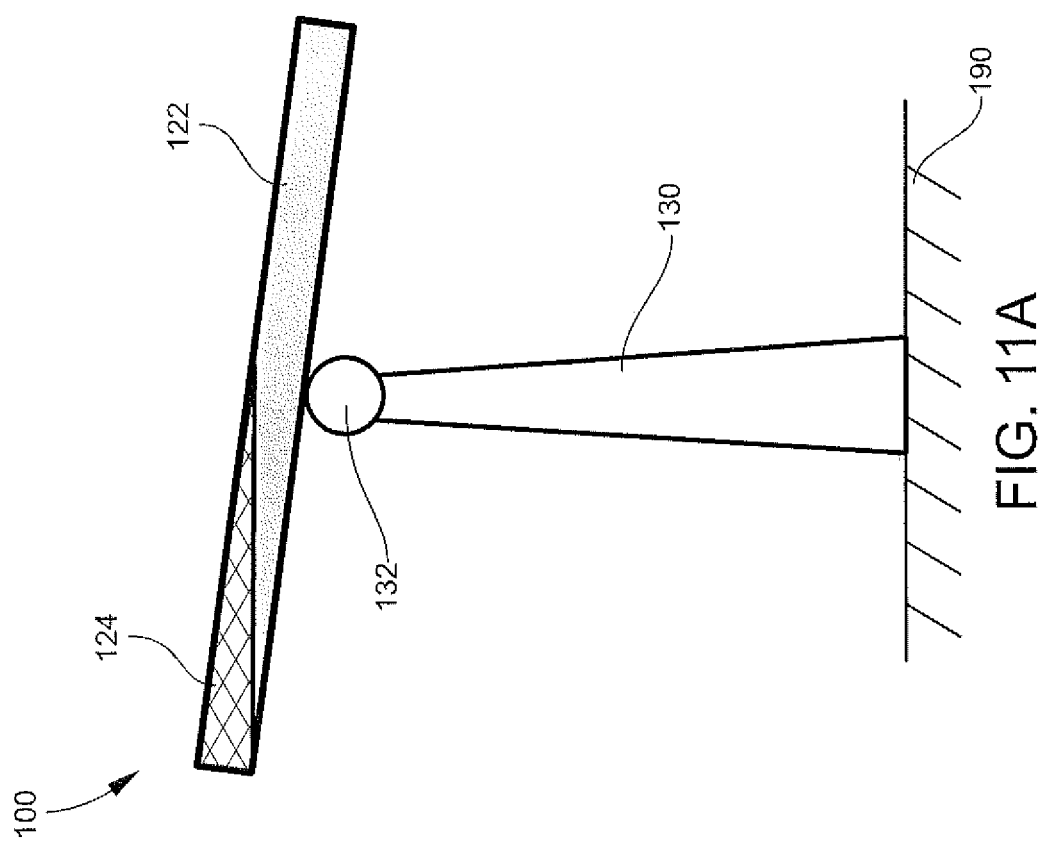

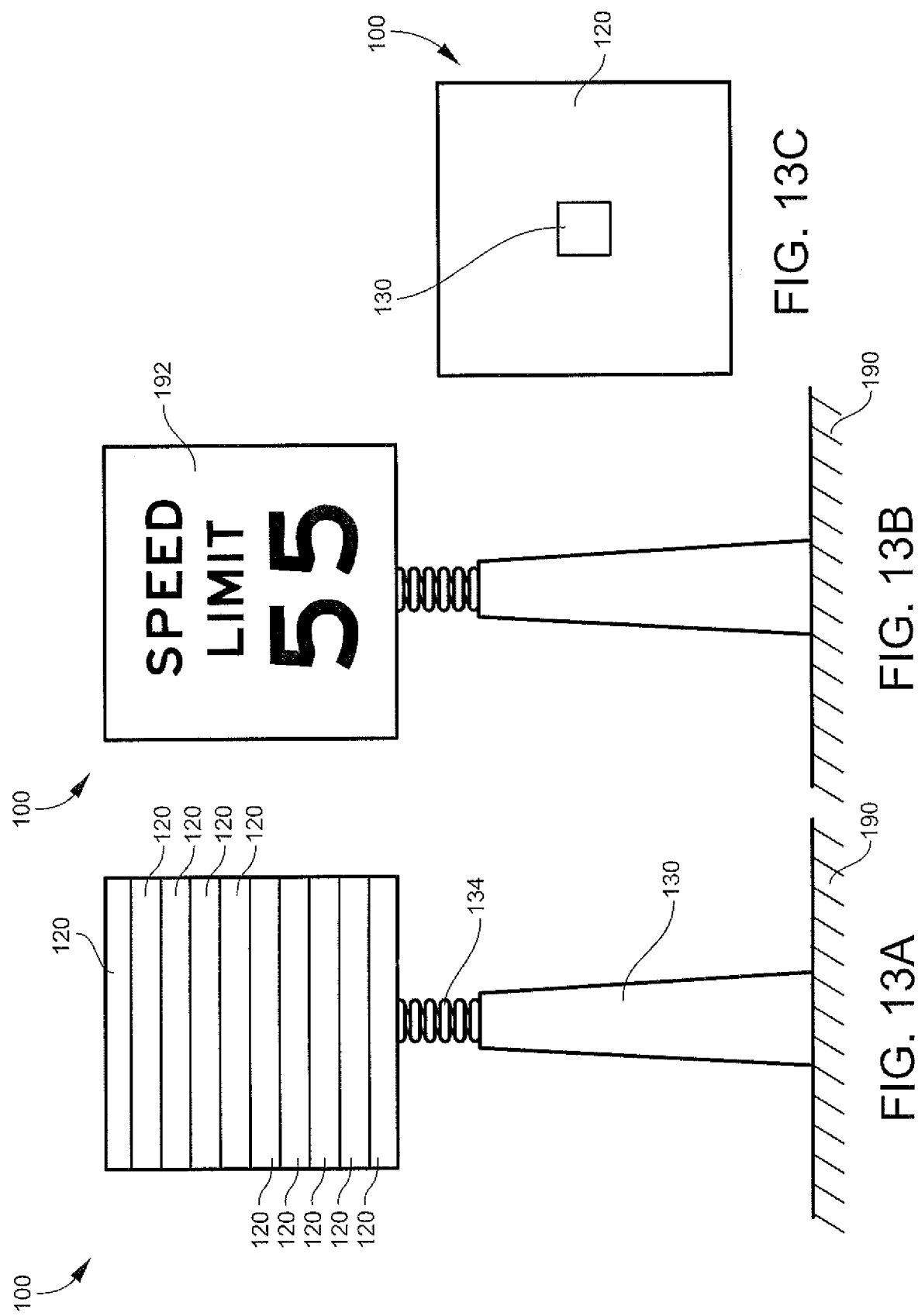

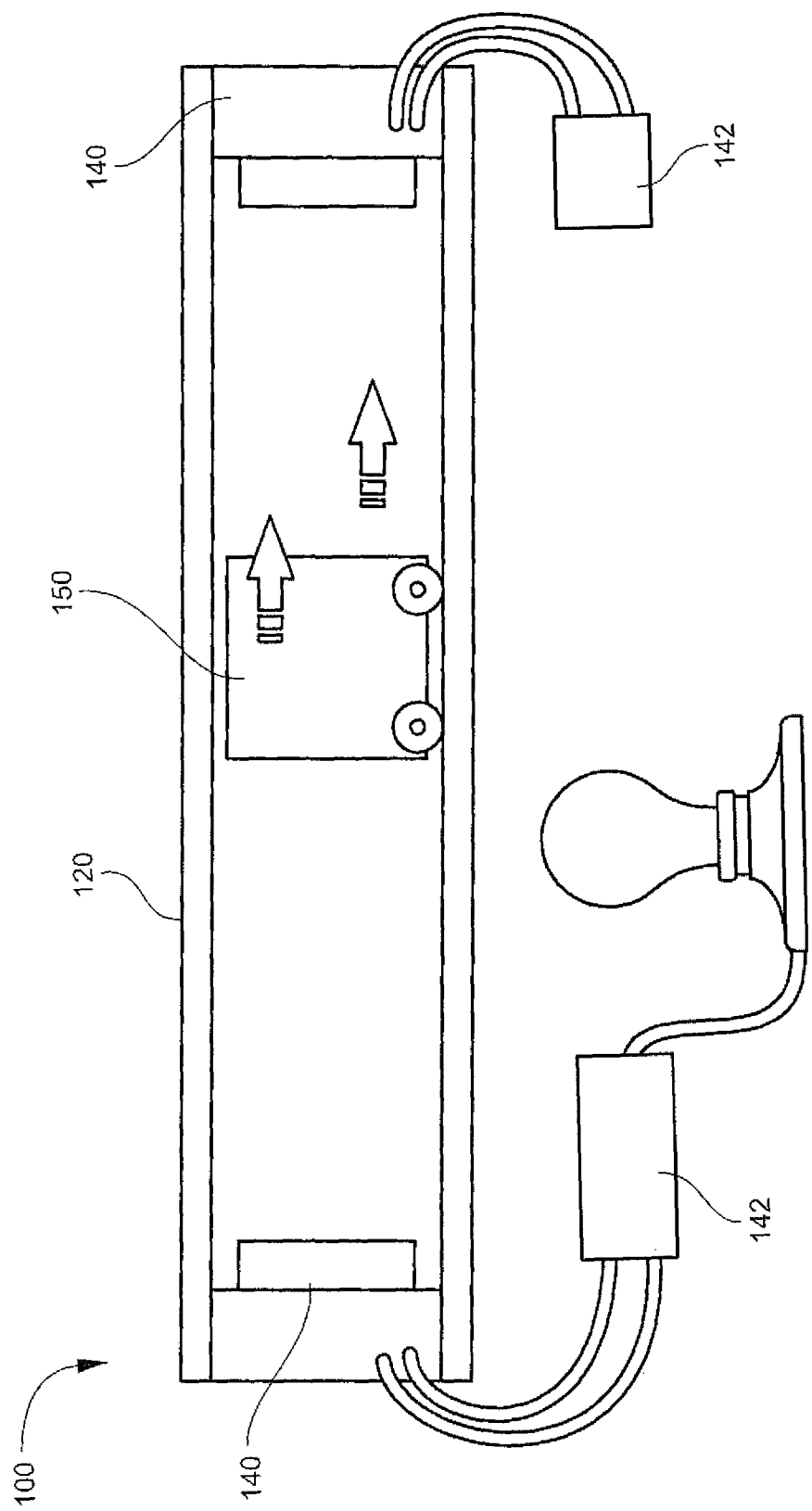

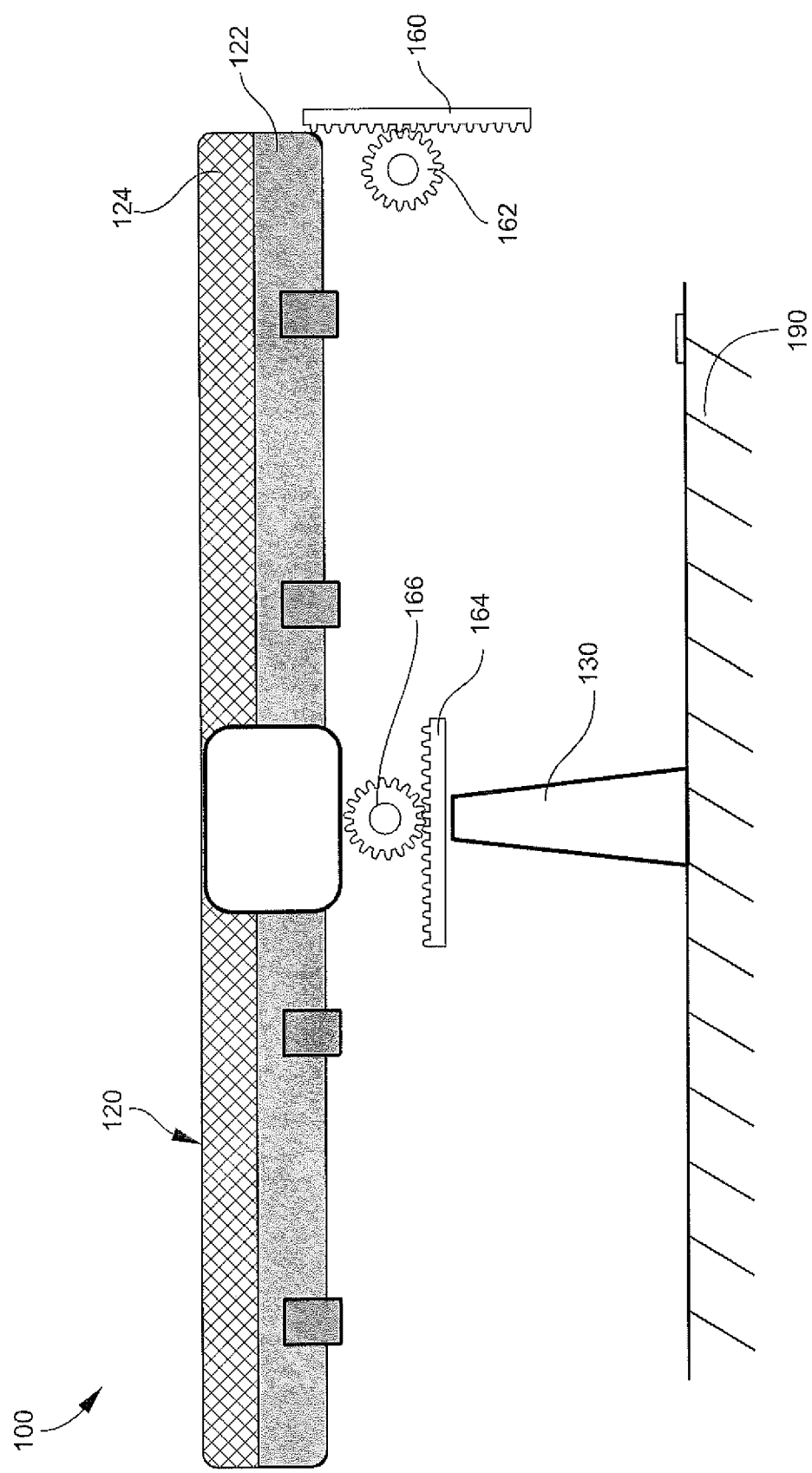

APPARATUS AND METHOD FOR GENERATING ELECTRICITY

CROSS-REFERENCE TO RELATED PATENT APPLICATIONS

This patent application is a continuation of co-pending, non-provisional application Ser. No. 15/046,609 filed Feb. 18, 2016, which traces priority to and claims the full benefit of U.S. provisional patent application No. 62/120,063 which was filed on Feb. 24, 2015. The Ser. No. 15/046,609 application is also a continuation-in-part of, traces priority to, and claims the full benefit of U.S. non-provisional patent application Ser. No. 14/607,209 filed on Jan. 28, 2015, now U.S. Pat. No. 9,637,013.

The Ser. No. 15/046,609 application is also a continuation-in-part of, traces priority to, and claims the full benefit of U.S. non-provisional patent application Ser. No. 14/935,604 filed on Nov. 9, 2015. The Ser. No. 14/935,604 application is itself a continuation of U.S. non-provisional patent application Ser. No. 14/468,489 filed on Aug. 26, 2014, now U.S. Pat. No. 9,212,653. The Ser. No. 14/468,489 is itself a continuation-in-part of U.S. non-provisional application Ser. No. 14/031,201 filed on Sep. 19, 2013, now U.S. Pat. No. 8,896,145. The Ser. No. 14/031,201 application is itself a continuation-in-part of U.S. non-provisional patent application Ser. No. 13/678,770 filed on Nov. 16, 2012, now U.S. Pat. No. 8,742,614.

All rights of priority are claimed to: the Ser. No. 15/046,609 application, the 62/120,063 provisional patent application, the Ser. No. 14/607,209 non-provisional patent application, the Ser. No. 14/935,604 non-provisional patent application, the Ser. No. 14/468,489 non-provisional patent application, the Ser. No. 14/031,201 non-provisional patent application, the Ser. No. 14/031,201 non-provisional patent application, and the Ser. No. 13/678,770 non-provisional patent application. Further, each of the above named applications are herein incorporated by reference in their entireties.

TECHNICAL FIELD AND BACKGROUND OF INVENTION

The invention relates generally to the field of power generation. More particularly, the invention relates to the field of generating power and electricity utilizing potential energy and the acceleration of falling objects due to Earth's gravitational force. The invention also relates to the field of generating power and electricity utilizing inertia of a moving object.

Earth's gravitational force refers to the acceleration that the Earth imparts to objects on or near its surface. This force is approximately 9.81 m/s$^2$ (32.2 ft/s$^2$). Due to this gravitational force, the speed an object falls near the surface of the Earth will accelerate at the rate of 9.81 meters per second per second. Of course, falling objects also encounter other resistances such as air resistance or the resistance of other fluids which counteracts the acceleration. This resistance results in a restraining force countering the gravitational force which, depending on the dynamics of the particular object, results in the object achieving a terminal velocity as it falls. That is, the falling object will accelerate due to the force of gravity until it reaches its terminal velocity. At the terminal velocity, the object will continue to fall at a constant rate but will no longer accelerate.

Potential energy has been recognized as a form of energy that may be translated into other forms of energy. Potential energy is the energy that an object has due to configuration or positioning. For instance, gravitational potential energy includes the potential energy of an object that depends upon the object's vertical position and mass. Thus, a boulder located at the top of a hill has a potential energy relative its vertical position of the ground at the bottom of the hill. Pushing the boulder over the edge of the hill will convert the potential energy into kinetic energy. That is, as the boulder rolls down the hill toward a lower elevation, due to the force of gravity, the potential energy translates into the movement of the boulder—the kinetic energy.

Engineers have utilized the potential energy, existing due to the gravitational force, by translating the potential energy into kinetic energy to generate power including electrical power. For instance, the potential energy of water stored in a lake may be converted into kinetic energy by releasing the water from a dam. This kinetic energy may be converted into electric energy by means of water released from the dam passing over a water wheel or turbine which rotates a permanent magnet generator, permanent magnet alternator, or electromagnet generator/alternator. This is sometimes referred to as "hydropower."

Unfortunately, water naturally stored at high elevations is a scarce resource. Only a fraction of the world's energy needs may be supplied by hydropower and even then, there exist environmental concerns from the damming of rivers and streams. Thus, a significant amount of the world's electrical energy is generated from the burning of fossil fuels and from nuclear energy. Such energy sources are disfavored because fossil fuels exhaust emissions which may pollute the environment and which may contribute to climate change. Similarly, nuclear energy has a host of disposal issues which can be costly and even deadly. Thus, there is a need in the art for a method and apparatus of generating power which is cost effective, readily available, which has little negative impact on the environment, and which is not dependent on the scarce resource of water stored at high elevations.

Further, because water is a fluid, droplets of water reach a terminal velocity more quickly than would a solid of the same mass. For instance, a liter of liquid water poured and dispersed from a height would reach terminal velocity quicker and thus ultimately generally accelerate less than a liter of solid water—ice—or a liter of water confined to a container dropped from the same height. Thus, existing hydropower plants utilizing the flow of liquid water do not capture the full potential energy possible because the water droplets reach a terminal velocity quicker than a solid of the same mass. Thus, there exists a long felt need in the art for a method of capturing the full potential of a mass of liquid water.

SUMMARY OF THE INVENTION

Therefore, it is an object of the present invention to provide an apparatus for and method of generating power, particularly electrical power, which utilizes the acceleration of a falling object due to the gravitational force. It is a further object of the present invention to provide an apparatus which reduces and minimizes the use of fossil fuels and/or nuclear power. It is a still further object of the present invention to capture and convert the full potential energy of water or other fluids at an elevated height into kinetic energy (accelerating downward) and then into mechanical and/or electrical energy.

These and other aspects of one embodiment of the invention are achieved by providing a power generating apparatus adapted for utilizing the potential energy of an object, such as a container of water or a vessel for holding water, created by the Earth's gravitational force. The object, such as a quantity of water, is loaded into a vessel which is then allowed to fall and to accelerate until the vessel holding the load approaches its terminal velocity. Of course, the object/vessel could hit the ground before reaching terminal velocity. This translates the potential energy into kinetic energy. The force of gravity acting on the accelerated vessel and load will generate power upon impact of a power capturing and generating device.

According to one embodiment, the power capture and generating device may be a hydraulic cylinder connected to a hydraulic generator whereby the impact of the vessel and its load on the hydraulic cylinder causes the hydraulic cylinder to depress which depression forces hydraulic fluid into a hydraulic generator. The hydraulic generator then generates power which may be electrical power.

According to another embodiment of the invention, the power capture and generating device may be a gear box connected to a flywheel and permanent magnet generator/alternator or other conventionally-powered alternator or generator, whereby the impact of the vessel and its load causes the flywheel to move, actuating the gear box to rotate. The rotation of the gear box rotates the permanent magnet generator/alternator or other conventional magnetic generator/alternator such as an electromagnetic generator which then generates power which may be electrical power.

According to another embodiment of the invention, the power capture and generating device may be a fluid bag connected to a hydraulic generator whereby the impact of the vessel and its load on the fluid bag causes the fluid bag to depress which depression forces hydraulic fluid into a hydraulic generator. The hydraulic generator then generates power which may be electrical power.

According to another embodiment of the invention, the vessel may be connected to a vertical pole which displaces the vessel at a top of the pole for collection of the load before being released to fall. The power capturing and generating device may be located below the pole.

According to another embodiment of the invention, the vessel may include one or more vessels positioned at either end of a beam. The beam may be located atop an elevated pivot and allowed to pivot left and right as a load is added and removed from the vessels. The power capturing and generating device may be located below each end of the beam.

According to another embodiment of the invention, the apparatus may be located adjacent a building and may include a device for collecting rain water from the roof of the building. The rain water is channeled into the vessel. Similarly, as with rain water, the apparatus may be located adjacent a building and may include a device for collecting sanitary sewer waste and the like. Similarly, as with rain water, the apparatus may be located adjacent a structure such as a bridge, overpass, or parking deck to collect storm water runoff.

According to another embodiment of the invention, the apparatus may include a pump which pumps water into the vessels. The pumps may be powered by electrical power generated by solar power captured via photovoltaic cells.

According to another embodiment of the invention, the apparatus may include a hermetically sealed vessel which is attached to a supporting structure. The hermetically sealed vessel may contain a working mass which may be a solid or a fluid, more than one solid, more than one fluid, or a combination of solids and fluids. For instance, the working mass may be a predetermined proportion of water and oil, or water and another fluid that is lighter than water. The hermetically sealed container may include an air void in addition to the water and oil. One of skill in the art will recognize that other fluids and/or solids may be substituted for the water and oil. According to such an embodiment, the hermetically sealed vessel may be rigid and may have an elongate shape, such as a cylinder, tube, or hollow rectangular prism. This elongate shaped hermetically sealed vessel defines a longitudinal axis along its length. The supporting structure facilitates the movement—preferably along the longitudinal axis—of the hermetically sealed vessel relative level ground. As the hermetically sealed vessel moves, the working mass moves within the hermetically sealed vessel. According to such an embodiment, the vessel further includes an energy capture device which is a device for translating the movement of the working mass into electrical energy.

According to one embodiment, the supporting structure is an elevated structure, such as a tower, extending vertically above horizontal ground. The supporting structure may be fixed to the ground (or to another structure) and the hermetically sealed vessel may be pivotally attached to the structure.

According to another embodiment, the supporting structure is an elevated structure, such as a tower, extending vertically above horizontal ground and which is attached to the ground (or to another structure) via springs or like equipment which facilities slight movement of the elevated structure. As used here, slight may be no more than five degrees of motion relative the vertical position. For instance, the elevated structure may be a sign mast attached to springs which permit the slight movement of the mast.

According to another embodiment, the supporting structure is a moving vehicle such as a train, truck, or automobile. According to such an embodiment, the working mass moves inside the hermetically sealed vessel as the vehicle moves relative the horizontal and also in response to cornering.

According to another embodiment, the supporting structure may be an ocean or sea going ship. The hermetically sealed vessel may be a water tank, ballast tank, sewage tank, fuel tank, and the like housed within the ship. As the ship moves on the seas, the working mass will move within the vessel.

According to another embodiment, the supporting structure may be a floating object such as a buoy. The floating object may be tethered to the sea bed but may have a degree of movement relative horizontal ground, the movement being actuated by the tides, waves, wind, etc. . . . . . According to such an embodiment, the hermetically sealed vessel would be attached to the buoy, allowing the working mass to move in response to the movement of the buoy.

According to one embodiment, the working mass is one or more fluids (such as oil and/or water) and the energy capture device includes one or more hydraulic generators. As the supporting structure facilitates movement of the hermetically sealed vessel, the fluids move within the vessel and pass through inlets of the hydraulic generators and out of outlets of the hydraulic generators. This movement of the fluids through the hydraulic generators generates an electrical current which may be tied to an electrical grid, may power a battery, or directly power on board equipment. For instance, where the supporting structure is a buoy floating in a body of water, the electricity generated by the hydraulic generator may be used to power electrical devices (lamps, computers, cameras, etc. . . . ) co-located on the buoy.

According to another embodiment of the invention, the working mass may be a multitude of spherical objects such as steel spheres or grains of sand, glass, and the like. These spheres may move inside the vessel in response to movement of the supporting structure and/or movement of the vessel. According to such an embodiment, the energy capture device may be a hydraulic cylinder coupled to a hydraulic generator. A hydraulic reservoir may be placed in line between the hydraulic cylinder and the hydraulic generator. As the spheres impact the hydraulic cylinder, the cylinder is compressed. The compressed hydraulic cylinder may transfer a quantity of hydraulic fluid through a hydraulic generator thereby generating electric energy. Alternatively, the hydraulic fluid may be stored in a hydraulic reservoir and released at a predetermined level so as to pass through a hydraulic generator.

According to another embodiment of the invention, the supporting structure facilitates movement of the vessel in response to wind. In some embodiments, the supporting structure may be deployed downstream from existing horizontal axis wind turbines, windmills and wind turbines such as prop driven turbines. Horizontal axis wind turbines typically have a mast raising a plurality of blades a distance above the ground. The air flow from the blades is dispersed downstream creating packets of wind—the blades having "chopped" the wind flow. Said another way, the blades disrupt the laminar wind flow into discrete bursts. The supporting structure can be deployed to take advantage of these packets of wind which will necessarily be intermittent due to the blades of the turbines. In this way, the vessel and/or the supporting structure may have a wind resisting surface which will pivot as the packets of air impact the wind resisting surface. This impact of the wind on the wind resisting surface will move the vessel causing the working mass to move and generate energy.

According to another embodiment of the invention, the supporting structure may be a automobile or other vehicle designed to move on the surface of the earth or in the air.

According to another embodiment of the invention, the supporting structure may include a plurality of vessels mounted parallel to each other.

According to another embodiment of the invention, the supporting structure may include a plurality of vessels mounted perpendicular to each other.

According to another embodiment of the invention, the supporting structure may include a plurality of vessels mounted in different horizontal planes, relative the horizontal ground.

According to another embodiment of the invention, the supporting structure may include a plurality of vessels mounted at an acute angle to one another.

According to another embodiment of the invention, the vessel may include one or more hydraulic fluid flow generators mounted inside the vessel. These fluid flow generators are of the type designed to have an inlet and an outlet. As fluid flows into the inlet and out of the outlet, electricity is generated. According to one such embodiment, as the vessel moves relative the horizontal, the fluid, which is the working mass contained in the vessel, may pass through the hydraulic fluid flow generators causing the generators to generate electricity. Appropriate electric conductors may be utilized, passing through the vessel wall, in order to pass electric current to the exterior of the vessel for the purpose of supplying electric power.

According to another embodiment of the invention, the vessel may include a track or path on which a working mass slides or rolls. The working mass may be a wheeled cart. Alternatively, the working mass may slide via a lubricant. The working mass may slide from one end of the vessel to the other as the vessel moves relative the horizontal. The vessel includes a pair of hydraulic cylinders disposed at either end of the vessel. When the working mass moves from one end to the next, it will impact the hydraulic cylinder causing it to compress. This compression may pass hydraulic fluid from the hydraulic cylinder to a hydraulic reservoir via appropriate hydraulic fluid lines. The hydraulic reservoir may be configured to release the hydraulic fluid once a predetermined pressure is realized. This released hydraulic fluid may be connected to a hydraulic generator which generates electricity when the released fluid passes through.

According to another embodiment of the invention, the vessel may be mounted to one or more rack and pinion gears operating together. Rack and pinion gears may be positioned perpendicular one another such that one rack and pinion acts as the pivot point for the vessel about a point and the other rack and pinion acts as a vertical adjustment point.

According to another embodiment of the invention, the vessel may be mounted to a vertical post or tower and allowed to pivot. The vessel may be filled with a working mass as described above. Additionally, a fluid filled bag may be disposed underneath either end of the vessel. The fluid filled bag may operate from an unexpanded to an expanded state. The fluid filled bag may be filled with a fluid that expands when heated and fluid filled bag may be designed to absorb heat when exposed to sun light so as to maximize the heat transferred to the fluid contained inside the bag. As the fluid filled bag heats from the sun, the fluid contained inside will expand causing the vessel to move upward. As the vessel moves upward, the working mass may produce energy (as the working mass moves) as discussed above. Additionally, the vessel may be biased in orientation such that when the fluid bag is in an unexpanded state, the vessel is in contact with the bag. Accordingly, as the fluid filled bag expands, the end of the vessel in contact with the bag will move upward.

BRIEF DESCRIPTION OF THE DRAWINGS FIGURES

Features, aspects, and advantages of a preferred embodiment of the invention are better understood when the detailed description is read with reference to the accompanying drawing, in which:

FIG. 10A is a side view of an embodiment of the apparatus having a hermetically sealed vessel filled with two fluids;

FIG. 10B is a side view of an embodiment of the apparatus having a hermetically sealed vessel filled with two fluids;

FIG. 11A is a side view of an embodiment of the apparatus having a hermetically sealed vessel filled with two fluids;

FIG. 11B is a side view of an embodiment of the apparatus having a hermetically sealed vessel filled with two fluids;

FIG. 13A is a side view of an embodiment of the apparatus having a plurality of hermetically sealed vessels filled with two fluids (not shown) and attached to a pole with spring movement;

FIG. 13B is a front side view of an embodiment of the apparatus having a plurality of hermetically sealed vessels filled with two fluids (not shown) and attached to a pole with spring movement;

FIG. 13C is a top view of an embodiment of the apparatus having a plurality of hermetically sealed vessels filled with two fluids (not shown) and attached to a pole with spring movement;

Figure 17B:
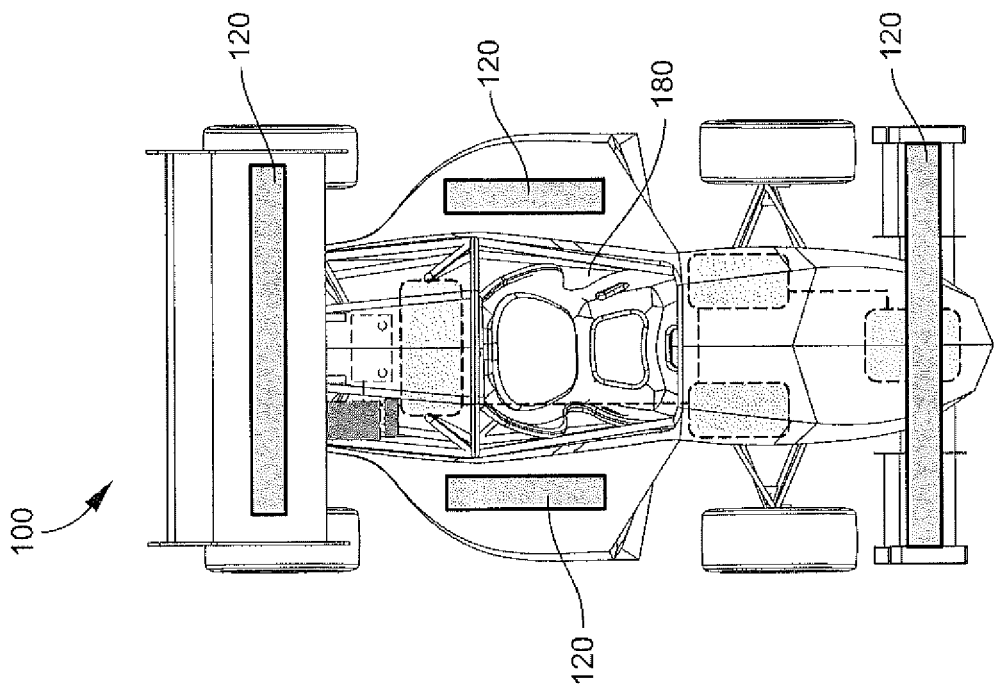
FIG. 17A is a perspective view of an embodiment of the apparatus having a plurality of hermetically sealed vessels filled with two fluids (not shown) and attached to a front and a rear of a vehicle perpendicular to a path of forward travel of the vehicle.
Figure 18:
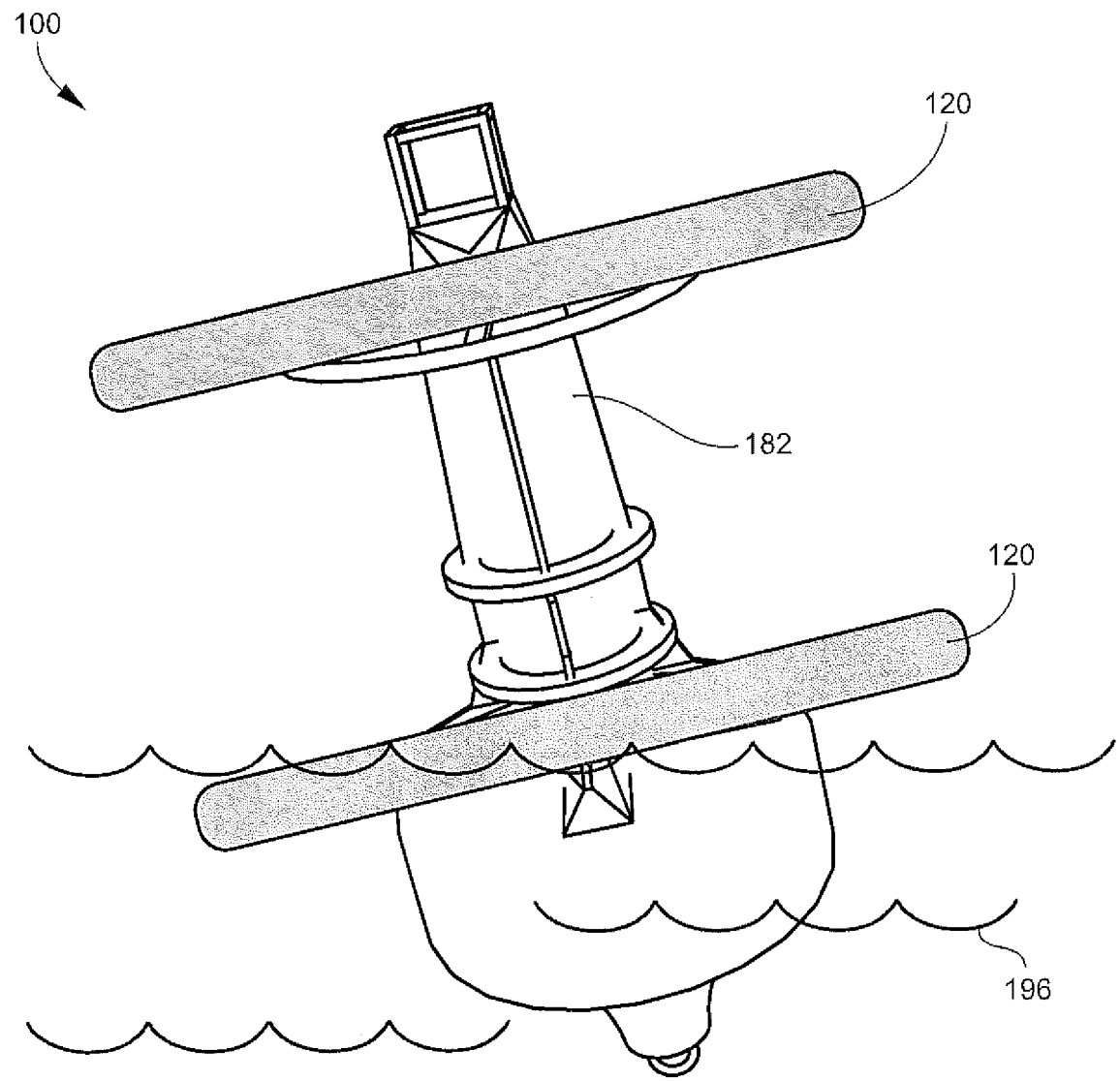
Figure 19:
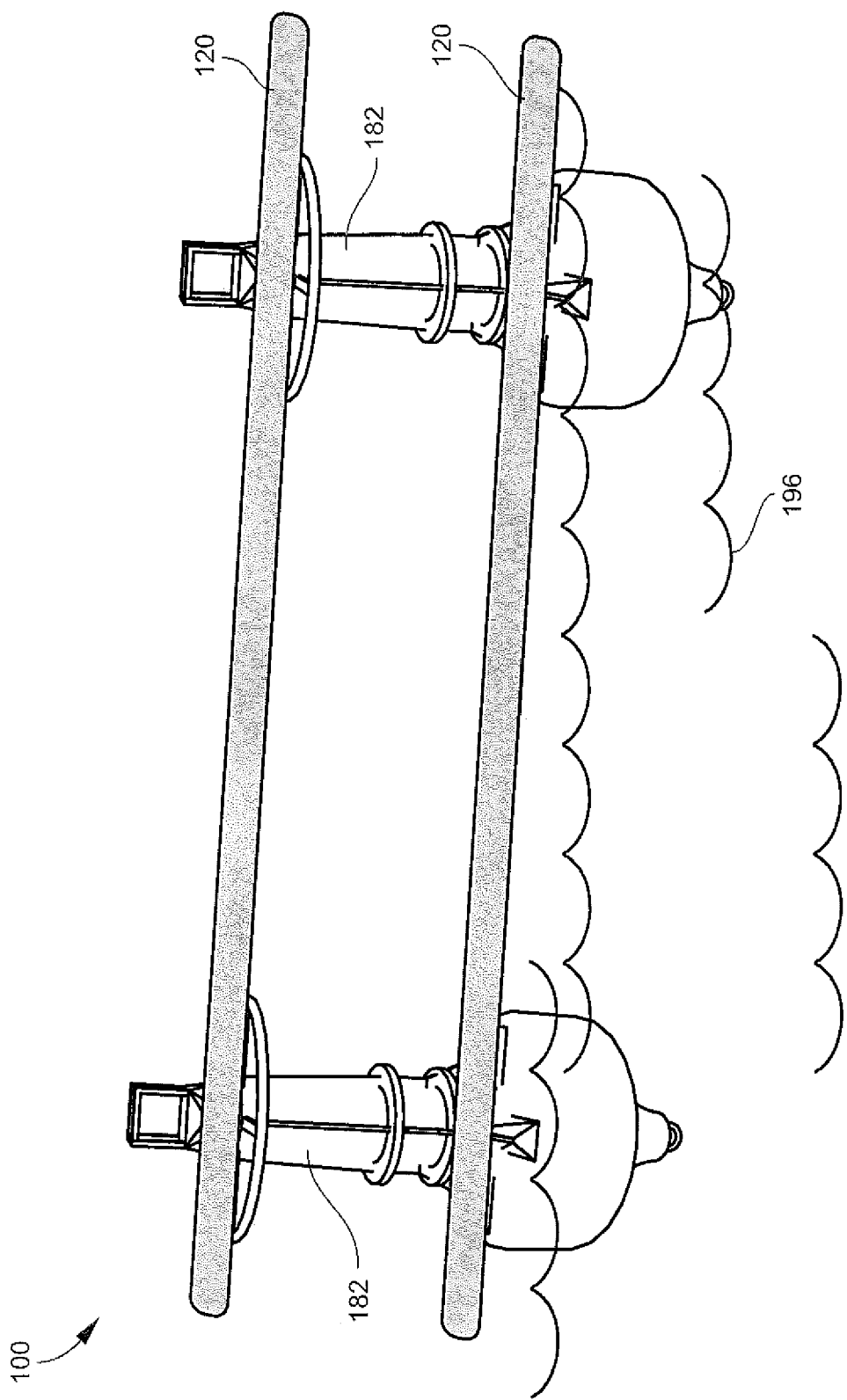
Figure 20:
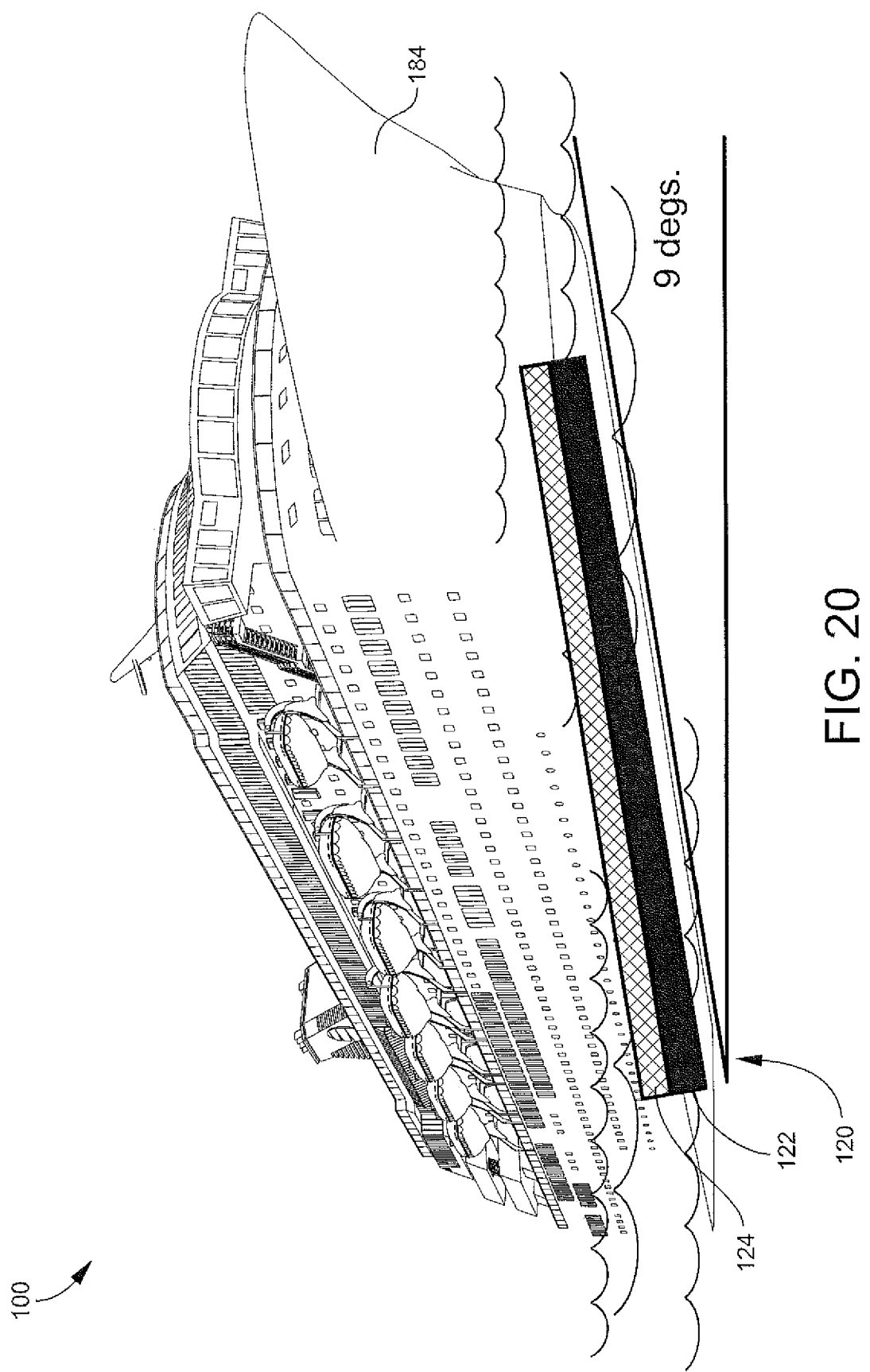
Figure 21:
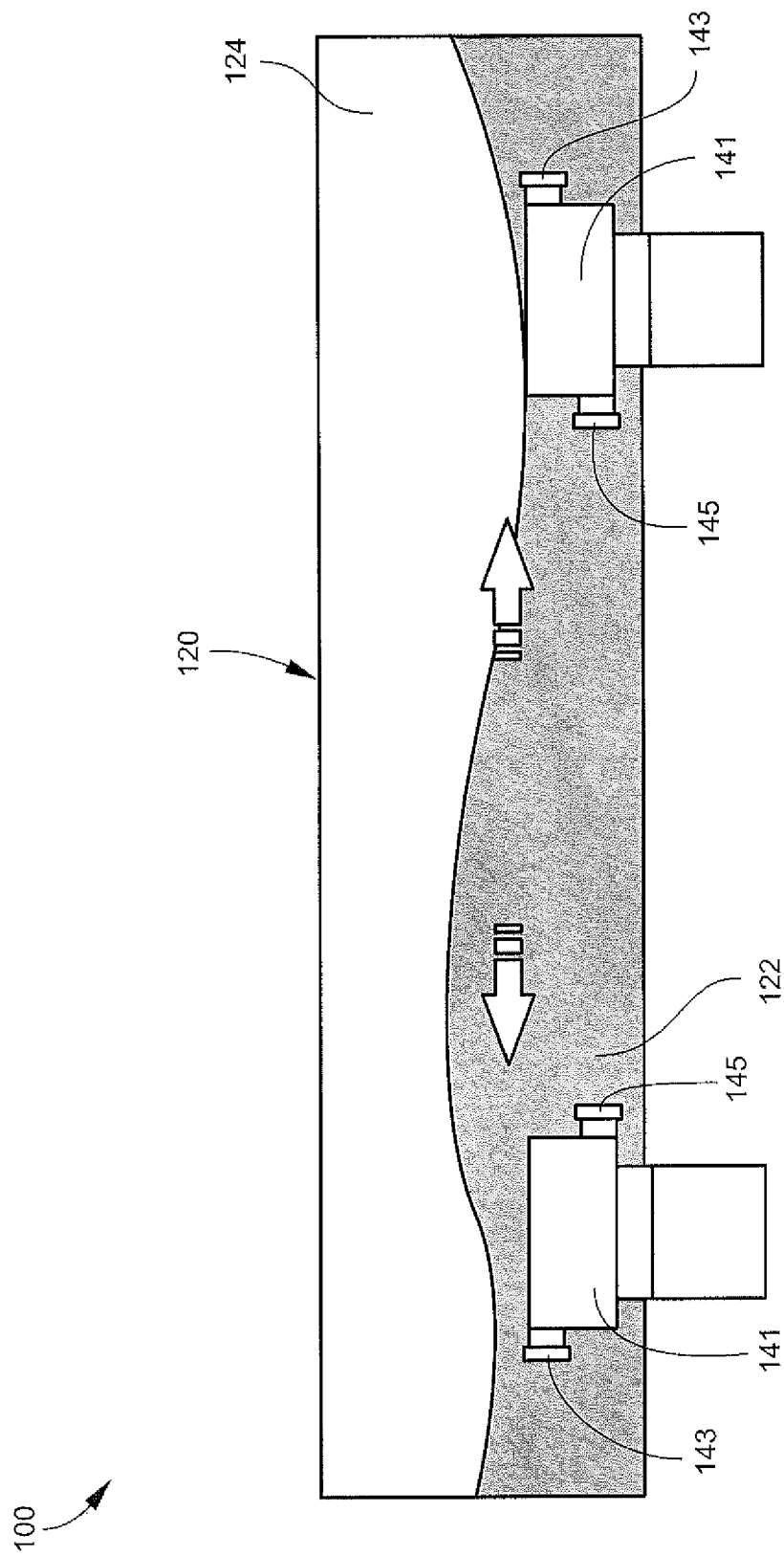
Figure 24A:
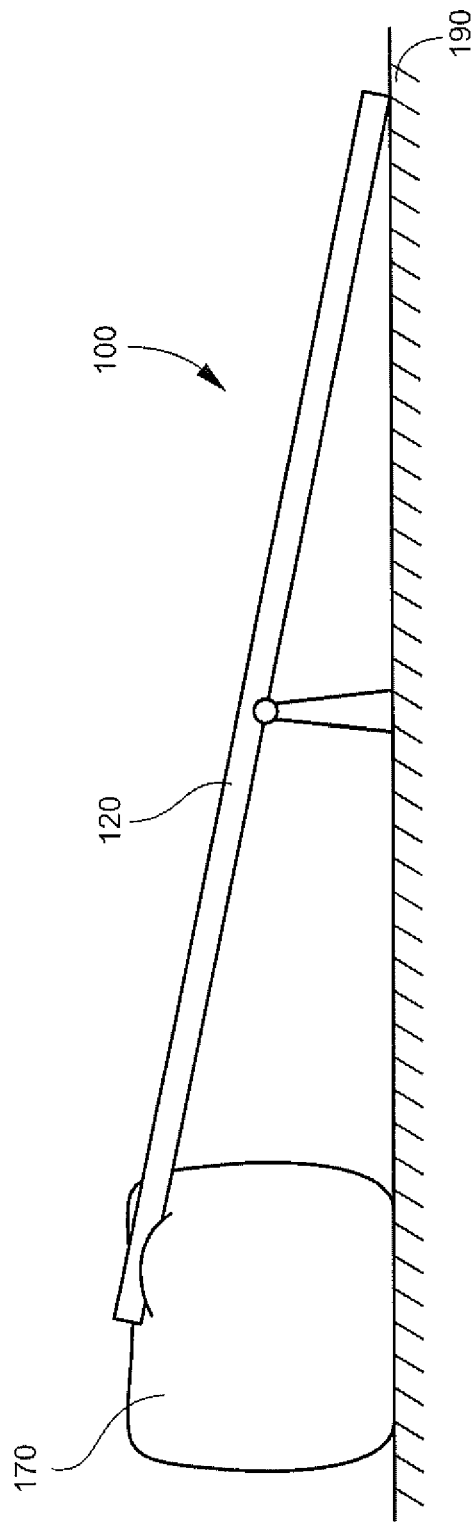
Figure 24B:
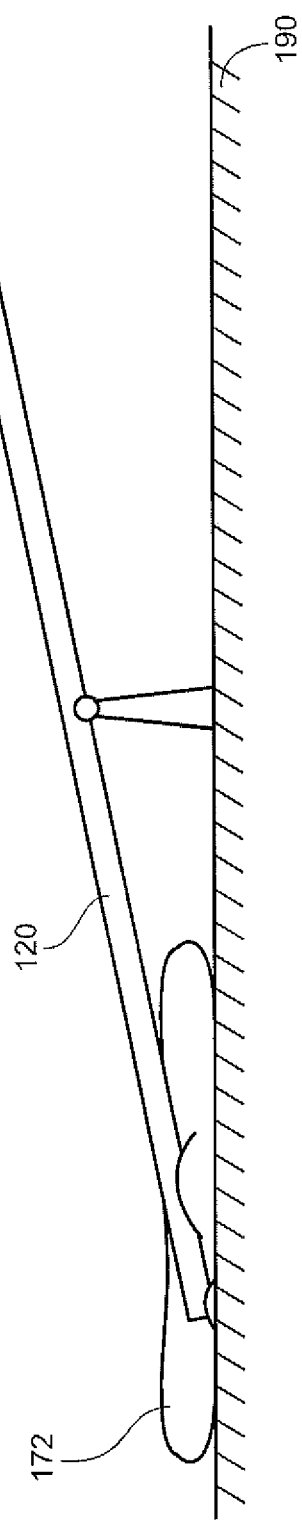

FIG. 17B is a perspective view of an embodiment of the apparatus having a plurality of hermetically sealed vessels filled with two fluids (not shown) and attached to a front and a rear of a vehicle perpendicular to a path of forward travel of the vehicle and also with a plurality of hermetically sealed vessels filled with two fluids (not shown) and attached to a left and right side of the vehicle parallel to a path of forward travel of the vehicle;

FIG. 18 is a side view of an embodiment of the apparatus having a plurality of hermetically sealed vessels filled with two fluids (not shown) and attached to a buoy floating in a body of water;

FIG. 19 is a side view of an embodiment of the apparatus having a plurality of hermetically sealed vessels filled with two fluids (not shown) and attached to a plurality of buoys floating in a body of water;

FIG. 20 is a perspective view of an embodiment of the apparatus having a hermetically sealed vessel filled located within an ocean going vessel;

FIG. 21 is a cutaway view of an embodiment of the apparatus having one or more hydraulic fluid flow generators mounted inside the hermetically sealed vessel;

FIG. 22 is a cutaway view of an embodiment of the apparatus having sliding working mass inside of a hermetically sealed vessel;

FIG. 23 is a side view of an embodiment of the apparatus having one or more rack and pinion gears operating about the vessel;

FIG. 24A is a side view of an embodiment of the apparatus having a hermetically sealed vessel mounted to a pivot post and utilizing a fluid filled bag disposed underneath either end of the vessel; and FIG. 24B is a side view of an embodiment of the apparatus having a hermetically sealed vessel mounted to a pivot post and utilizing a fluid filled bag disposed underneath either end of the vessel.

DETAILED DESCRIPTION

The present discussion is a description of exemplary embodiments only and is not intended as limiting the broader aspects of the present invention. The following example is provided to further illustrate the invention and is not to be construed to unduly limit the scope of the invention.

Figure 1:
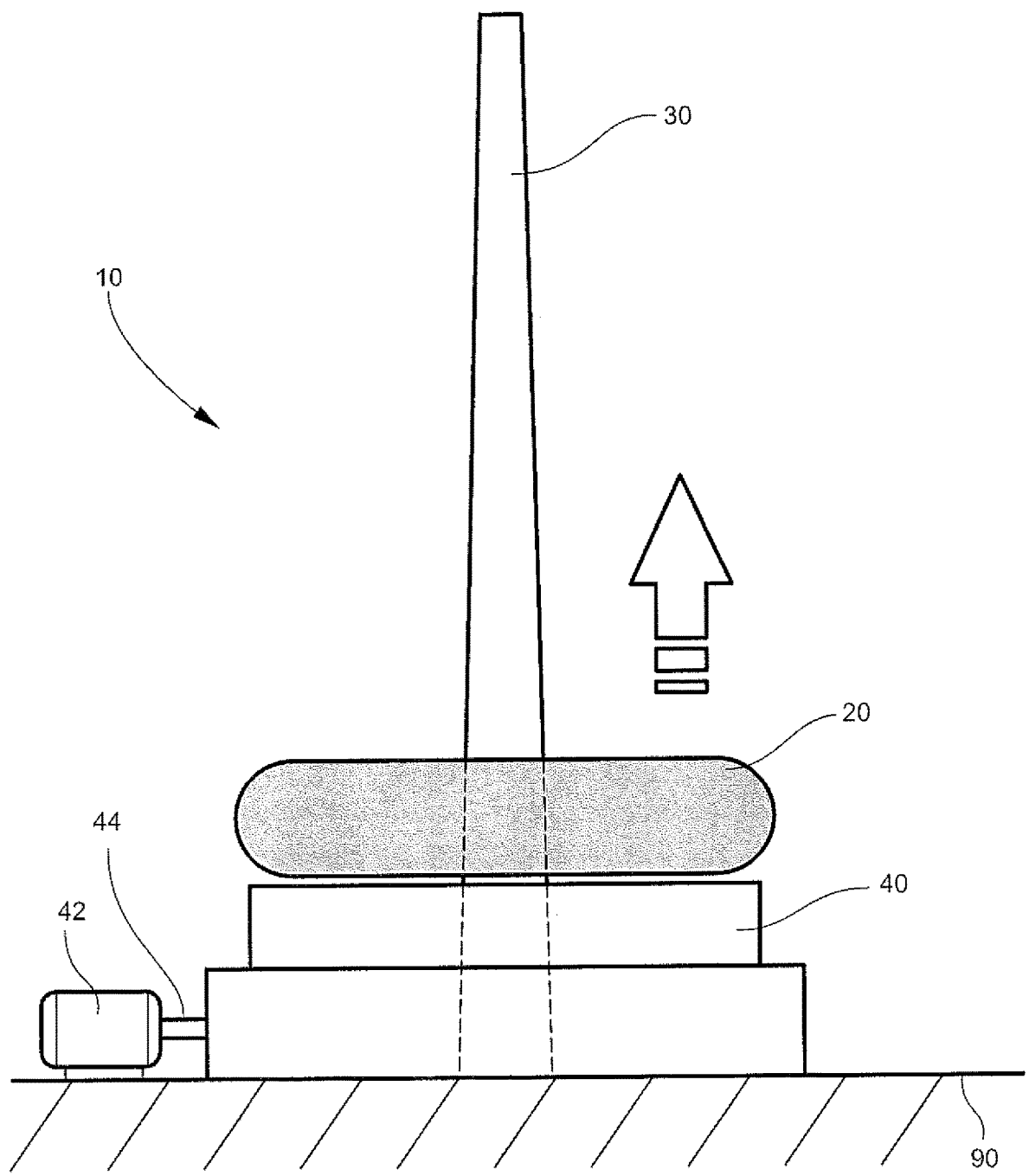
FIG. 1 is side view of an embodiment of the apparatus with the empty vessel at the first position.
Figure 2:
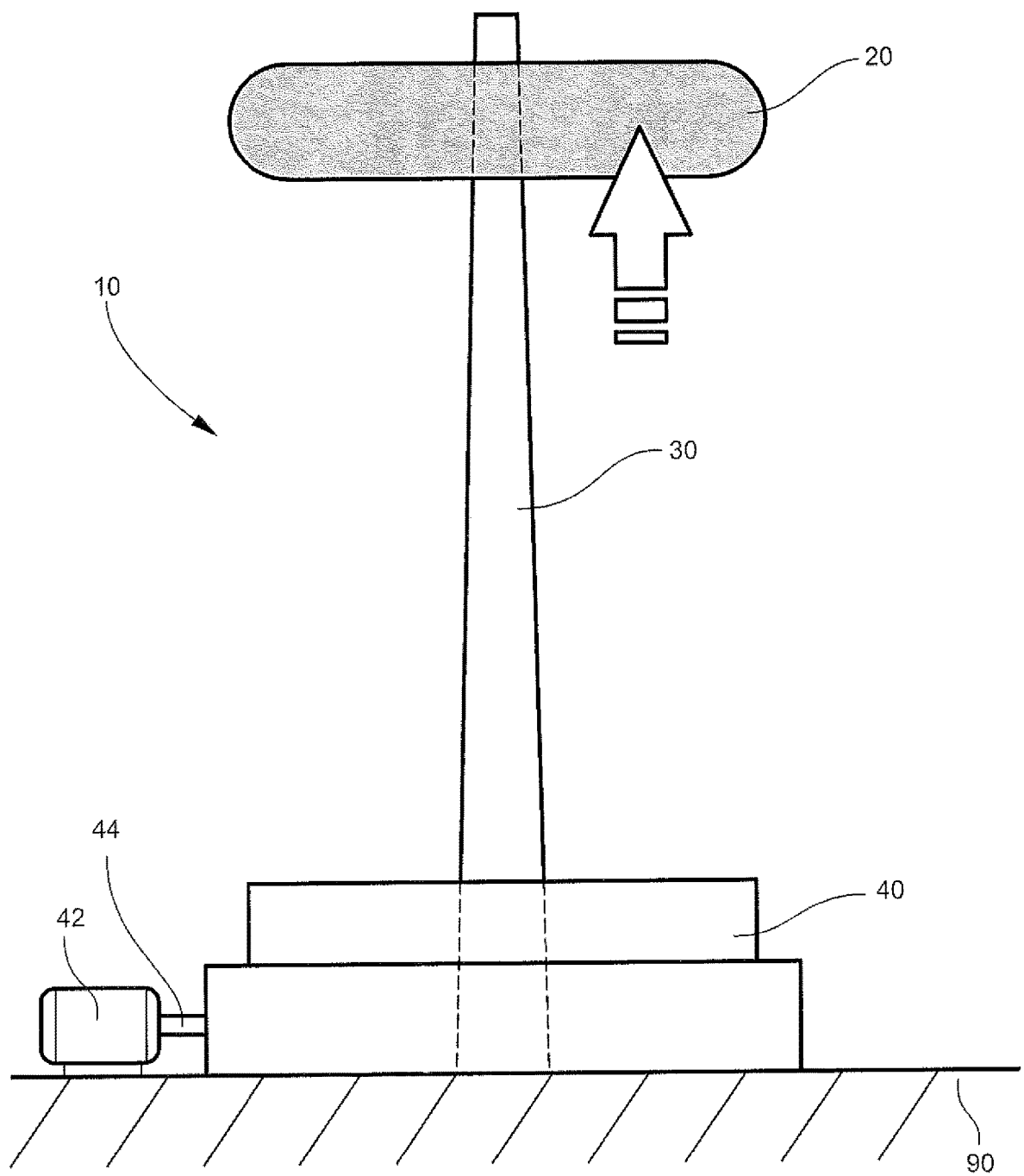
FIG. 2 is a side view of an embodiment of the apparatus with the vessel having moved to the second position and begun to be filled.

Referring to the drawings wherein identical reference numerals denote the same elements throughout the various views, FIGS. 1-5 show an embodiment of the invention 10 utilizing a vessel 20 slidingly attached to a vertical pole 30, spindle, tower, and/or other like structures. The vessel is capable of holding a fluid such as water or oil. Alternatively, the vessel 20 could also hold other objects having a mass such as metal spheres, soil, rocks, wood, wood chips, plastic, and the like. The vessel 20 is capable of being filled and unfilled. The vessel 20 moves from a first position, as shown in FIG. 1, near the bottom of the pole 30 to a second position near the top of the pole 30 as shown in FIG. 2. As shown, the pole 30 is a vertical cylinder but could be other vertical structures capable of displacing the vessel 20 a distance away from the Earth's surface 90.

A hydraulic cylinder 40 is located at the bottom of the pole 30, beneath the vessel 20. A hydraulic generator 42 is connected to the hydraulic cylinder 40 via hydraulic fluid lines 44. The hydraulic cylinder 40 is charged with hydraulic fluid. A hydraulic reservoir (not shown) (such as a hydraulic accumulator) may be connected and located in-line between the hydraulic cylinder 40 and the hydraulic generator 42. According to such an embodiment, the hydraulic reservoir may accumulate hydraulic fluid as charged by movement of the hydraulic cylinder 40. The hydraulic reservoir may be calibrated to release hydraulic fluid to the hydraulic generator 42 at a predetermined pressure level. The hydraulic generator 42 may produce electrical energy and may be connected to an electrical power grid.

A mechanical lift (not shown) is attached to the vessel and may be attached to the pole. The mechanical lift is designed to lift the vessel from the first position at the bottom of the pole to the second position at or near the top of the pole. Alternately, the pole may be a lever, and the vessel may be biased in the upward position.

Figure 3:
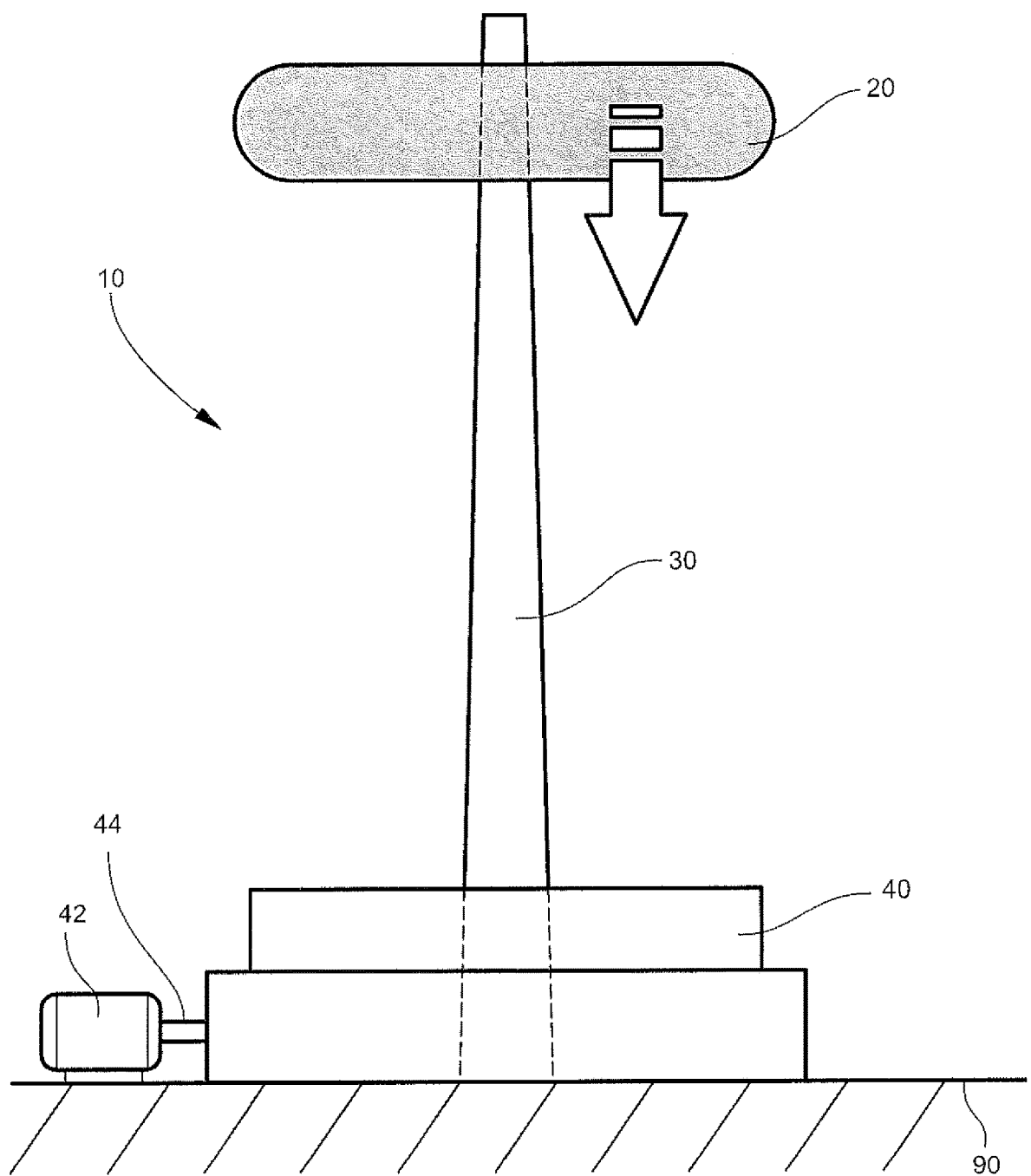
FIG. 3 is a side view of an embodiment of the apparatus with the vessel having been filled and beginning to fall due to the gravitational force.
Figure 4:
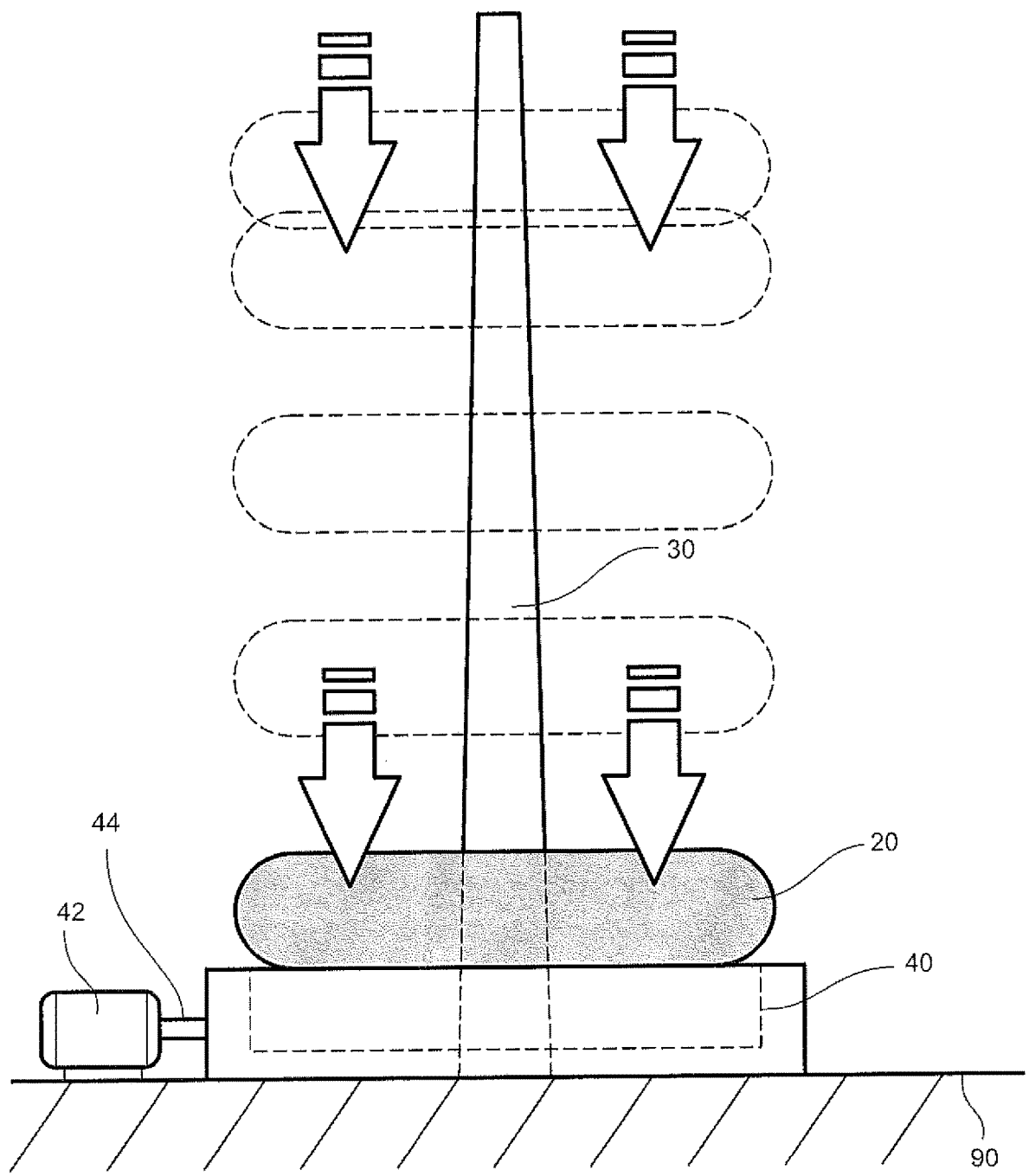
FIG. 4 is a side view of an embodiment of the apparatus with the vessel having been filled, having completely fallen, and having compressed the hydraulic cylinder.
Figure 5:
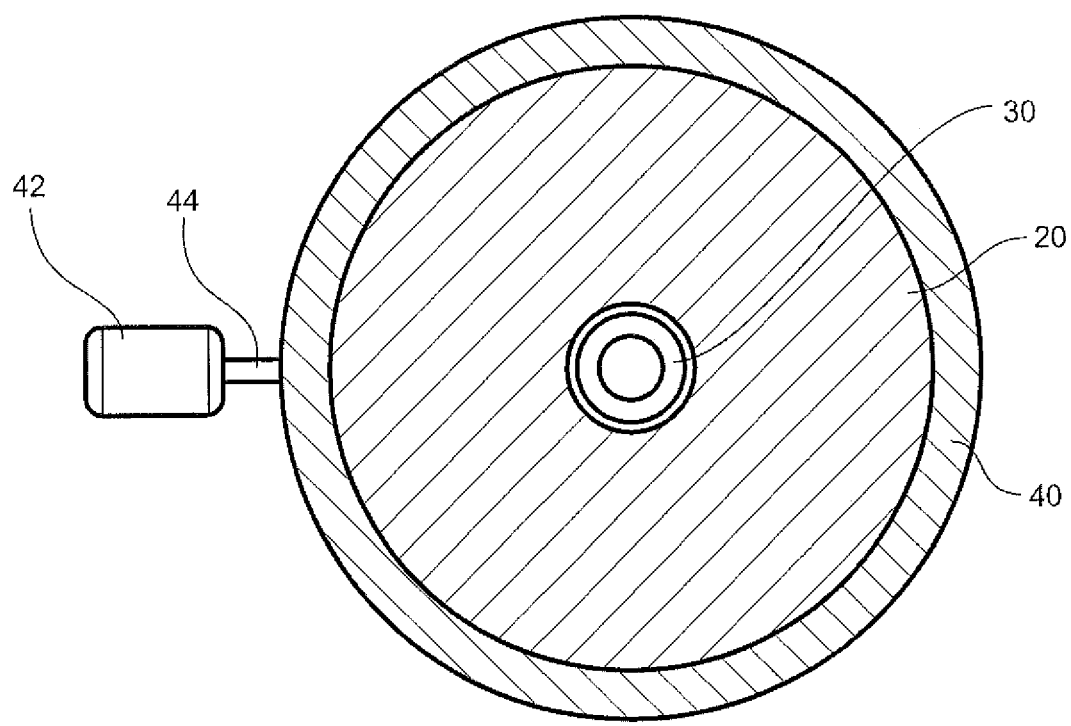
FIG. 5 is a top view of an embodiment of the apparatus of FIGS. 1-4.

The apparatus of FIGS. 1-5 generates power by capturing the kinetic energy of the falling vessel 20. The vessel 20 is filled/loaded with a mass at the top of the pole 30, as shown in FIGS. 2 and 3. The loaded vessel 20 is then allowed to fall from the second position to the first position as shown in FIG. 4. The vessel 20 will fall due to the force of gravity. The vessel 20 will accelerate as it falls until it reaches its terminal velocity or otherwise contacts the ground 90 or energy capturing device 40. As the loaded vessel 20 falls, it will accordingly accelerate or fall at its terminal velocity until it impacts the hydraulic cylinder 40. The impact of the falling object—particularly one that has greatly accelerated—will cause the hydraulic cylinder 40 to compress as shown in FIG. 4. The compression of the hydraulic cylinder 40 will cause the hydraulic fluid to enter hydraulic generator 42 via the fluid lines 44 and generate power (or to be stored in the hydraulic accumulator according to the alternate embodiment).

Before falling, the vessel 20 must first be filled. The vessel 20 may be filled at either the first (FIG. 1) or the second position (FIG. 2). If filled in the first position, the mechanical lift must be capable of lifting the vessel 20 and its load. In a preferred embodiment, the vessel 20 is filled in the second position shown in FIG. 2. According to such an embodiment, the vessel 20 may be filled according to many different alternatives.

In one embodiment, the vessel 20 and pole 30 are positioned adjacent a building structure (not shown) and rain water collected from the roof of the building is drained into the vessel 20. When full, a trigger set to a predetermined value based in the mass of the vessel will cause the vessel 20 to fall.

In another embodiment, solar panels, such as photovoltaic cells (or other power device) collect power and pump/carry water or other mass into vessel 20 which has been carried via the mechanical lift to the top of the pole 30. When full, a trigger will cause the vessel 20 to fall.

After the vessel 20 has fallen and compressed the cylinder 40, the contents of the vessel 20 are emptied. In the embodiment where the vessel 20 had been filled with water, the water may enter a municipal supply, used in irrigation, or stored in a reservoir for later use. Alternatively, the mass may remain in the cylinder and the hydraulic lift may carry the loaded vessel 20 to the top of the pole 30.

The apparatus of FIGS. 1-5 runs in continuous cycle as the vessel 20 is carried from the first position to the second position, loaded, and then allowed to fall under the force of gravity. The loaded vessel 20 will accelerate, compress the hydraulic cylinder 40 and generate power.

The apparatus 10 may be positioned adjacent a water fall (not shown), with the water from the water fall operating the apparatus 10. Capturing the water in vessels 20 at the top of a waterfall, letting them fall and accelerate more or less freely, and capturing the impact of their fall, as opposed to merely using the weight of the water whose downward fall is limited by the fact that is has to lift the dead weight of a water wheel acting counter to it, would serve to improve the overall efficiency and output of the unit. The force produced by the acceleration of the falling water would far exceed the force of gravity as currently limited by hydropower systems. Further, according to the invention, the apparatus 10 does not lift any dead weight except for the weight of the empty containers 20 (as opposed to traditional water wheels). This use, maximizing efficiency of falling water would qualify more waterfalls, previously not considered for electrical generation, as potential sites.

In a further embodiment of the apparatus 10 of FIGS. 1-5, rather than the use of hydraulic cylinders 40 and hydraulic generators 42 to generate power and electricity (or in combination with them), one or more levers become in contact with the falling vessel (not shown). The levers are hingedly attached to the pole 30 (which may be two or more poles with the vessel falling between). As the vessel 20 contacts a first end of each of the plurality of levers, the second end extend away from the pole 30 is forced upward. The upward movement of these levers turn ratchets or sprag clutches with cranks and shafts. This movement may turn drums at a high torque. This Torque could then be translated into power using conventional electro or permanent magnetic generator/alternators.

In a still further embodiment of the apparatus of FIGS. 1-5, rather than the use of hydraulic cylinders 40 and hydraulic generators 42 to generate power and electricity (or in combination with them or also in combination with the levers discussed above) the vessel 20 could be attached to cables, ropes, and the like (not shown). As the vessel 20 falls, towards the bottom of their fall as they accelerate and approach terminal velocity, the vessels 20 may pull the cables on reels. This pulling of the cables would turn the reels which in turn could turn shafts. This turning could then be translated into power using conventional electro or permanent magnetic generator/alternators.

Figure 6:
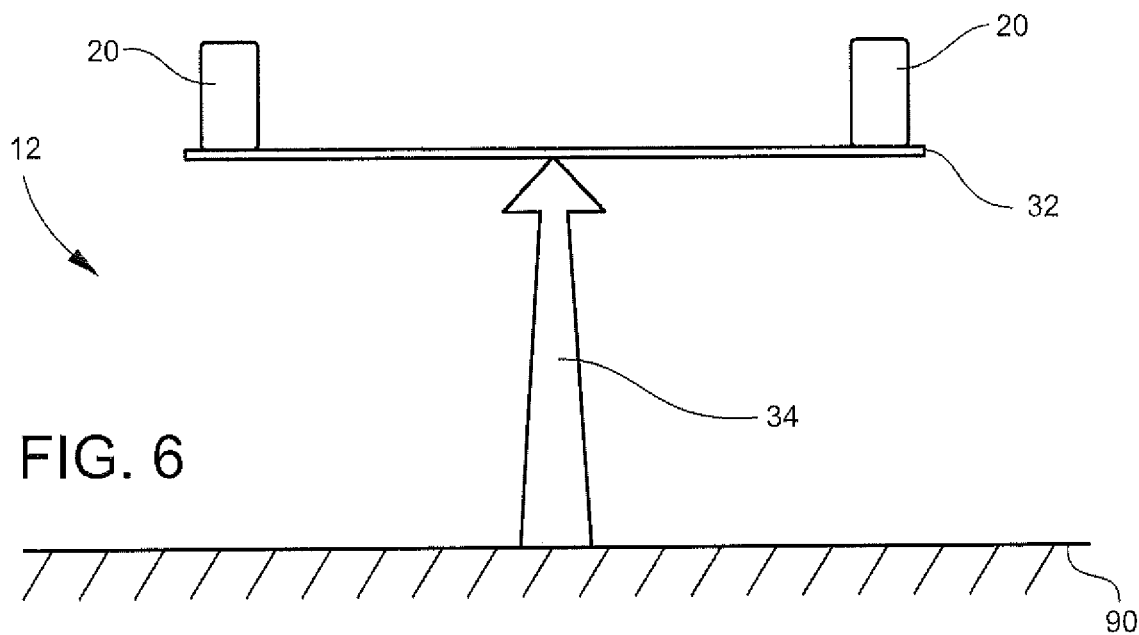
FIG. 6 is a side view of an embodiment of the apparatus having two vessels.
Figure 7:
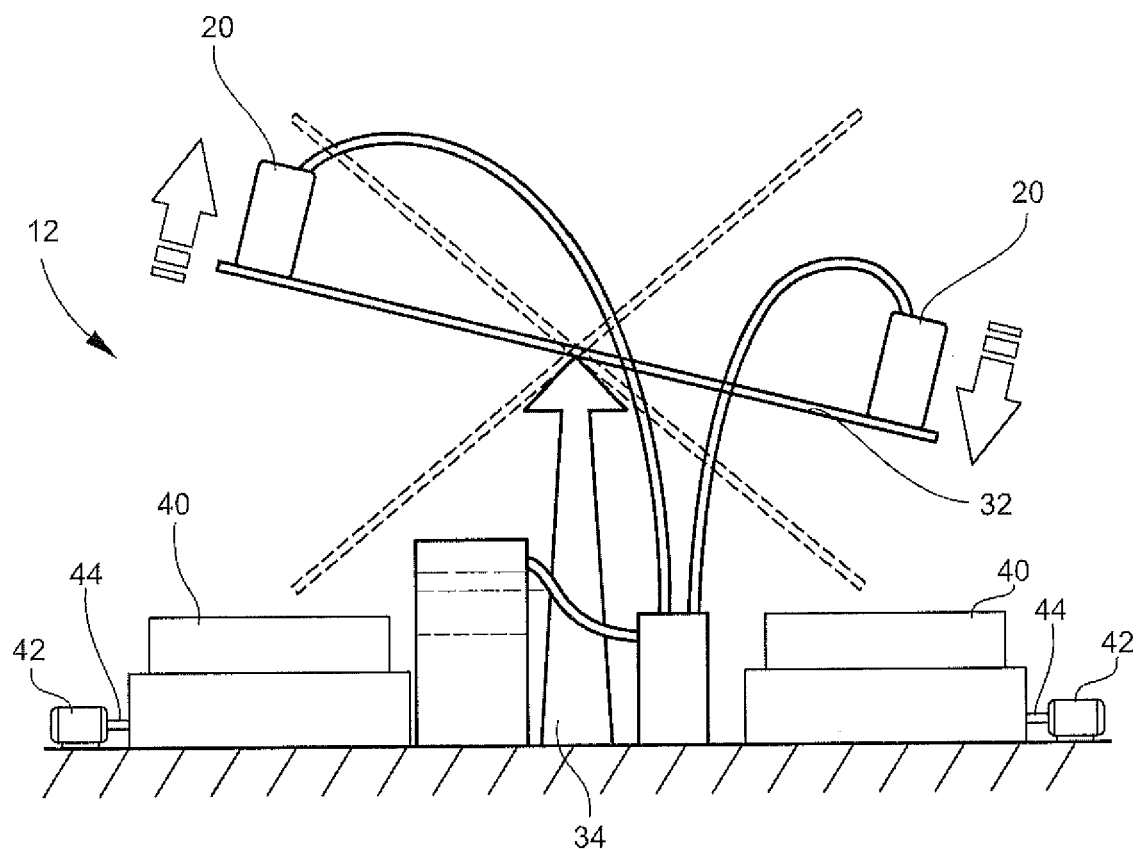
FIG. 7 is a side view of an embodiment of the apparatus having two vessels and utilizing a pair of hydraulic cylinders.
Figure 8:
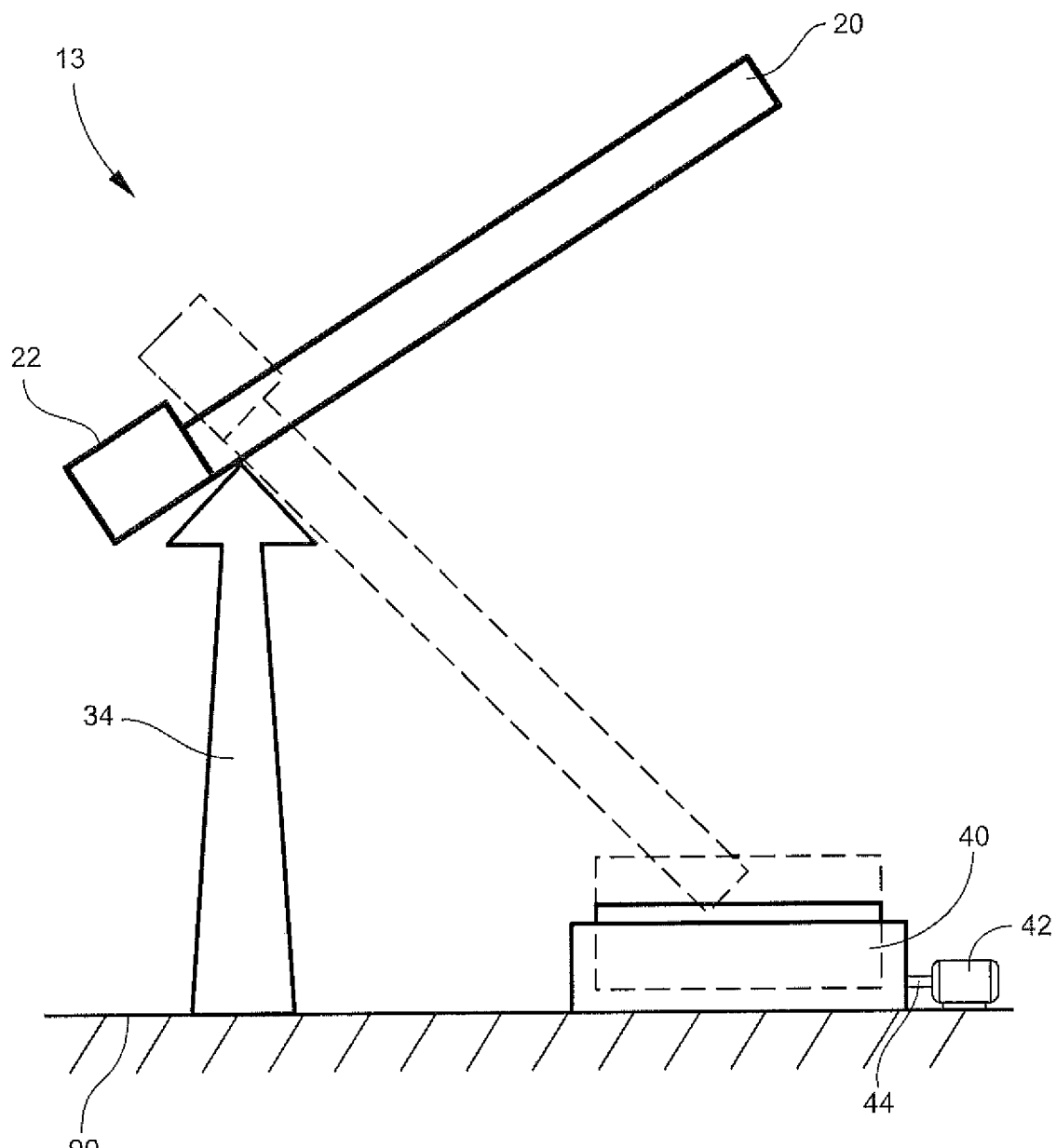
FIG. 8 is a side view of an embodiment of the apparatus having a single vessel balanced by a ballast end and utilizing a single hydraulic cylinder.
Figure 9:
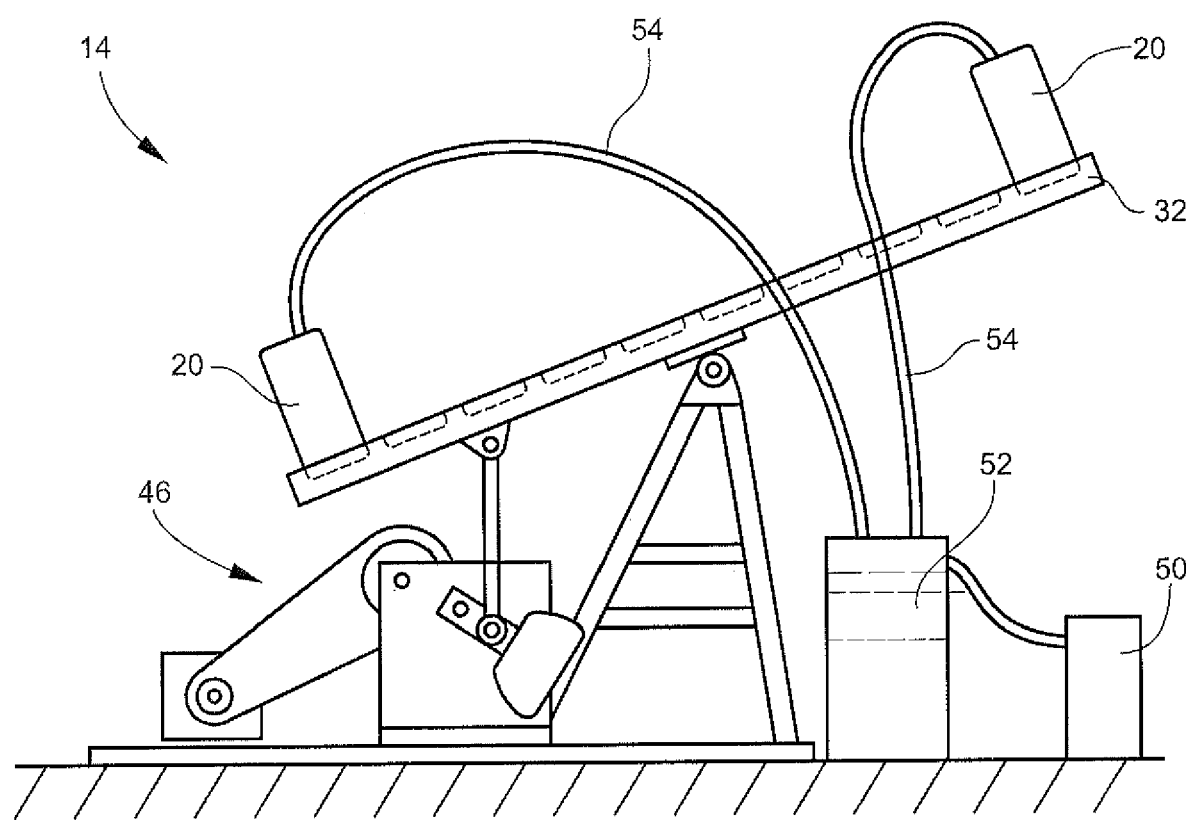
FIG. 9 is a side view of an embodiment of the apparatus having two vessels and utilizing a gear box.

The apparatus 12 of FIGS. 6-9 functions under the same essential principles as FIGS. 1-5. FIGS. 6, 7, and 9 utilize two vessels 20 whereas FIG. 8 utilizes a single vessel 20. The apparatus of FIGS. 6 and 7 includes a beam 32 positioned atop an elevated pivot 34. The vessels 20 are arranged at either end of the beam 32. The vessels 20 may be loaded and unloaded with a mass as described above with respect to FIGS. 1-5. That is, the vessels 20 may be loaded with water, oil, soil, rocks, metal spheres, wood chips, etc. . . . . The mass may be pumped or otherwise loaded into and evacuated from the vessels 20.

In a preferred embodiment of FIGS. 6-7, hydraulic cylinders 40 are positioned beneath each of the respective ends of the beam 32. Each of the hydraulic cylinders 40 is connected to a hydraulic generator 42 via hydraulic fluid lines 44 as shown. Alternatively, each of the hydraulic cylinders 40 may be connected to a single hydraulic generator 40 (not shown). Further, one or more hydraulic reservoirs (hydraulic accumulators) (not shown) may be connected between the respective hydraulic cylinder 40 and the hydraulic generator(s) 42. In this embodiment, a fluid reservoir such as a tank holds water or oil which is pumped into one of the vessels 20. As the fluid is pumped into the vessel 20, the beam 32 will accelerate downward towards one of the hydraulic cylinders 40. The loaded vessel 20 will accelerate downward and, upon impact, depress the respective hydraulic cylinder 40. Upon such depression, the hydraulic fluid will operate the hydraulic generator 42. A trigger may be arranged whereby upon impact of the respective vessel 20 with the respective hydraulic cylinder 40, the vessel 20 is emptied. The fluid from the respective vessel 20 may be emptied back into the fluid reservoir or it may be pumped into the second vessel 20.

Where the fluid is pumped into the other vessel 20, the beam 32 will rotate in the opposite direction and eventually impact the other hydraulic cylinder 40, generating power as with the first cylinder 40. See FIG. 7.

Alternatively, if the fluid is emptied from the first vessel 20 into the reservoir, fluid will then be pumped into the other vessel causing the beam 32 to rotate in the opposite direction and eventually impact the other hydraulic cylinder 40, generating power as with the first cylinder.

According to the embodiment 13 shown in FIG. 8, only a single vessel 20 is utilized. A ballast 22 is located where the second vessel is located in the embodiment of FIGS. 6-7. As shown in FIG. 8, the vessel 20 may be the beam itself. That is, the beam may be hollow and hold the fluid or other mass. According to the embodiment 14 of FIG. 9, a pair of vessels 20 are located at opposite ends of a beam 32 as with FIGS. 6-7. However, rather than utilizing hydraulic cylinders 40 and hydraulic generators 42, the embodiment of FIG. 9 utilizes a gear box, flywheel, and permanent magnet generator/alternator, or conventionally-powered alternator or generator, to generate electrical power 50. A mass (fluid) reservoir 50 holds the mass that is pumped via a pump 52 into the vessels 20. As shown in FIG. 9, fluid is pumped by a pump 52 via tubing 54 into the first vessel 20. This causes one side of the beam 32 to lower. The pump 52 then pumps the fluid out of the first vessel and into the second vessel. Alternatively, when the first vessel reaches bottom (ground) a valve (not shown) opens to release the water into a storage tank/reservoir or even to an irrigation field. Removal of water from the first vessel and pumping water into the second vessel causes the beam to move in the other direction, lowering the end of the second reservoir. The movement of the beam operates the flywheel which actuates the gear box turning the permanent magnetic generator and generating electricity. Alternatively, rather than having fluid pumped into the vessels, water may fall from rain water collected on the roof of a building.

FIGS. 10A-24B are directed to another embodiment 100 of the invention that may utilize a hermetically sealed vessel 120 containing a working mass. Here, the working mass may be a combination of fluids, 122, 124 as shown in FIGS. 10A-21 or the working mass may be a solid 150 sliding on a path or track, such as a wheeled cart, as shown in FIG. 22. Alternately, the working mass could be a single fluid. Likewise, the invention would work with even a single hydraulic generator contained within a single vessel. Any discussion of best mode should not negate such alternatives which are expressly contemplated by this invention.

In the embodiment 100 using the combination of fluids 122, 124, the hermetically sealed vessel 120 may include a hollow cylinder or a hollow rectangular prism. One of the fluids may be water 122 and the other oil 124. However, one of the fluids needs to be lighter than the other so that the respective fluids do not mix. Preferably, such fluids are immiscible.

As shown in FIGS. 10A, 10B, 11A, and 11B, the hermetically sealed vessel 120 may be pivotally mounted to a supporting structure 130 at pivot point 132. The supporting structure 130 may be mounted to the ground 190 or other supporting surface.

Figure 12:
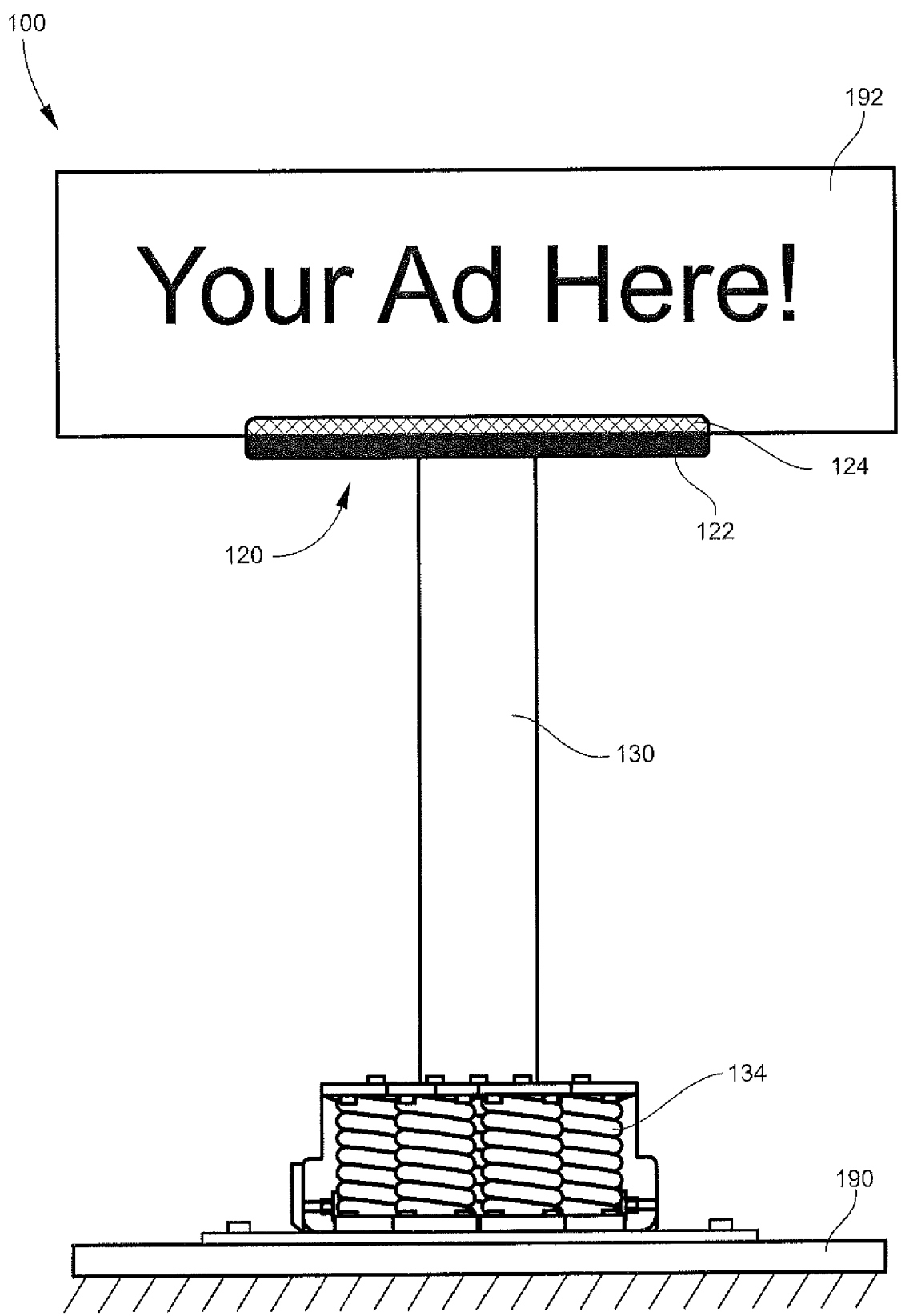
FIG. 12 is a front side view of an embodiment of the apparatus having a hermetically sealed vessel filled with two fluids and attached to a pole with spring movement.

As shown in FIG. 12, the hermetically sealed vessel 120 may be positioned atop a supporting structure 130. The supporting structure 130 may be attached to a support surface 190, such as the ground, via spring supports 134. An airfoil 192, which may include advertising indicia, may be attached to the hermetically sealed vessel 120. The airfoil 192 may respond to the wind or other environmental forces causing the supporting structure 130 to move about the springs 134 relative the supporting surface 190. As used here, the "airfoil" is preferably a planar wind-resisting surface. Accordingly, the hermetically sealed vessel 120 will move causing the oil 124 and water 122 to flow within the vessel. This movement is particularly shown in FIGS. 10A, 10B, 11A, and 11B. As the hermetically sealed vessel moves, the oil 124 (or fluid of less mass than water such as air) will move to the higher end of the vessel 120 while the heavier water 122 will move to the lower end.

FIGS. 13A, 13B, and 13C include additional embodiments wherein a plurality of stacked hermetically sealed vessels 120 are arranged one on top of the other. The stack of vessels 120 may provide a surface 192 to function as an airfoil. This airfoil 192 may additionally include advertising indicia, traffic safety signs, direction signs, messages, artwork, and the like. The supporting structure 130 may be attached to a supporting surface 190 such as the ground and the plurality of vessels 120 may be attached to the supporting structure 130 via a spring mount. As wind, air, and other environmental forces impact the airfoil 192, the plurality of hermetically sealed vessels 120 will move relative the horizontal causing their contents to likewise move. That is, the fluids 122, 124 will move as described above, with the lighter fluid moving atop the heavier fluid.

Figure 14A:
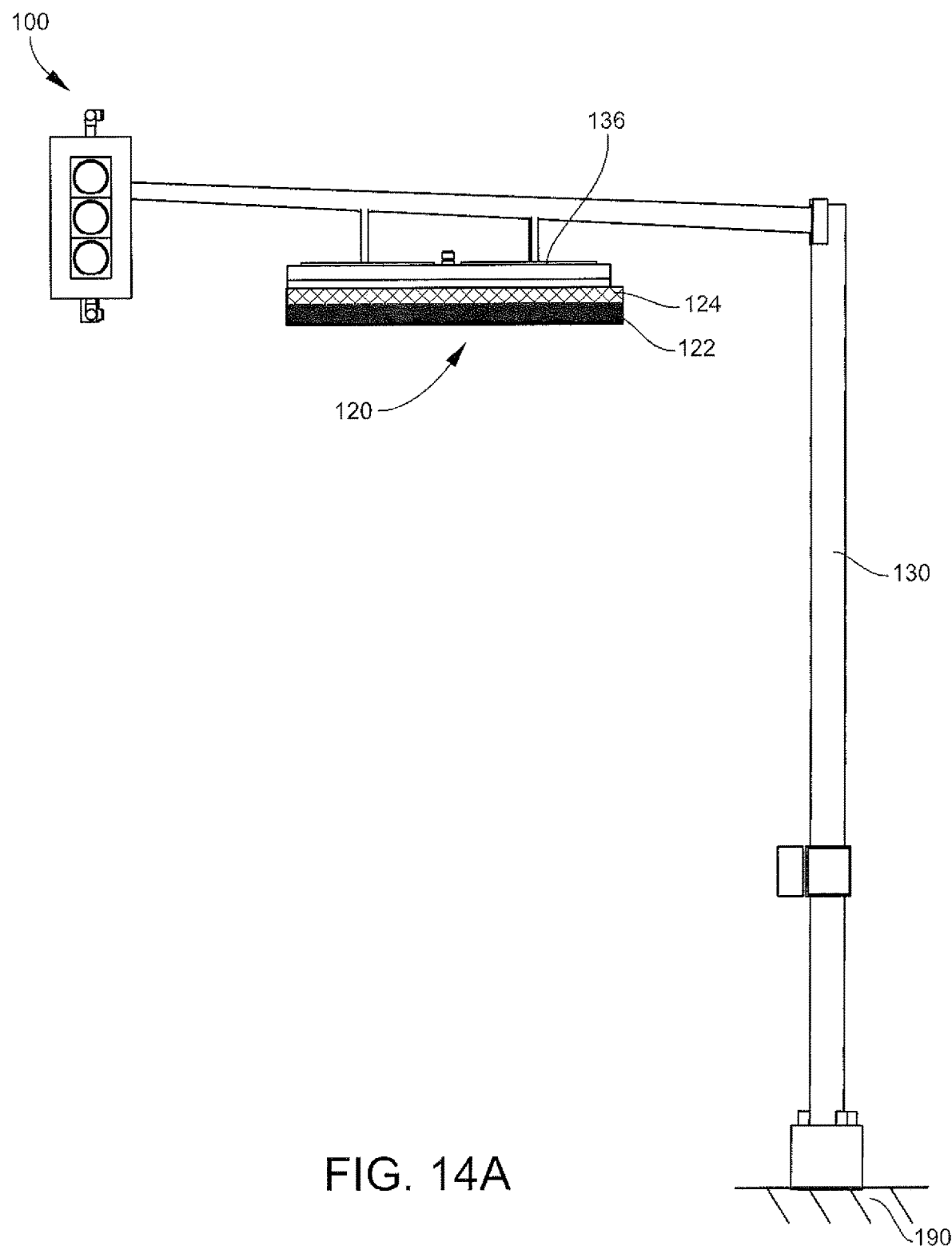
FIG. 14A is a side view of an embodiment of the apparatus having a hermetically sealed vessel filled with two fluids and moveably suspended from a traffic device pole.
Figure 14B:
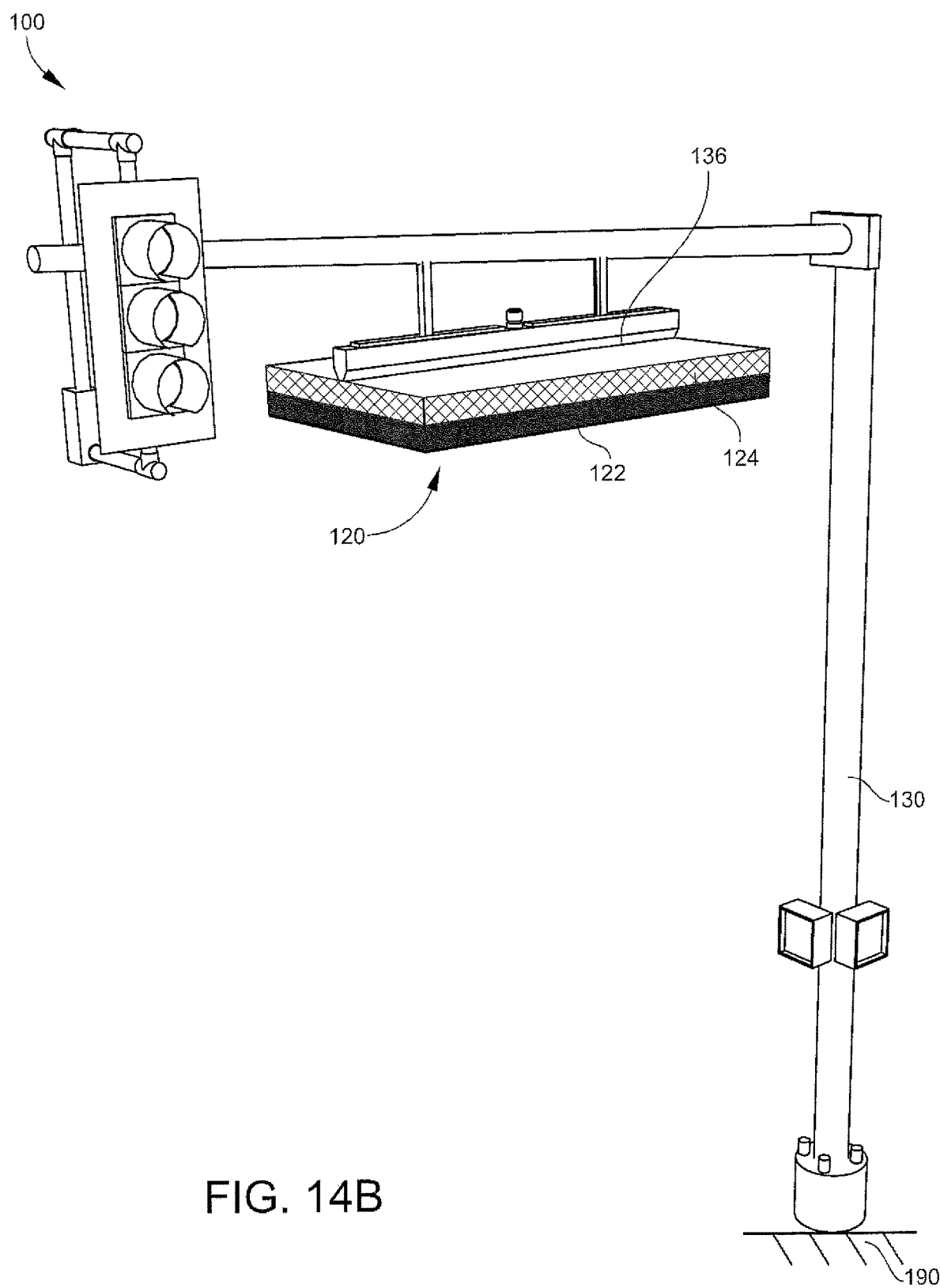
FIG. 14B is a perspective view of an embodiment of the apparatus having a hermetically sealed vessel filled with two fluids and moveably suspended from a traffic device pole.

FIGS. 14A and 14B include another embodiment of the invention 100 where the hermetically sealed vessel 120 is attached to a traffic signal post which is the supporting structure 130. The vessel 120 is attached via a hinged connection 136 which allows the vessel 120 to swing about the structure 130.

Figure 15:
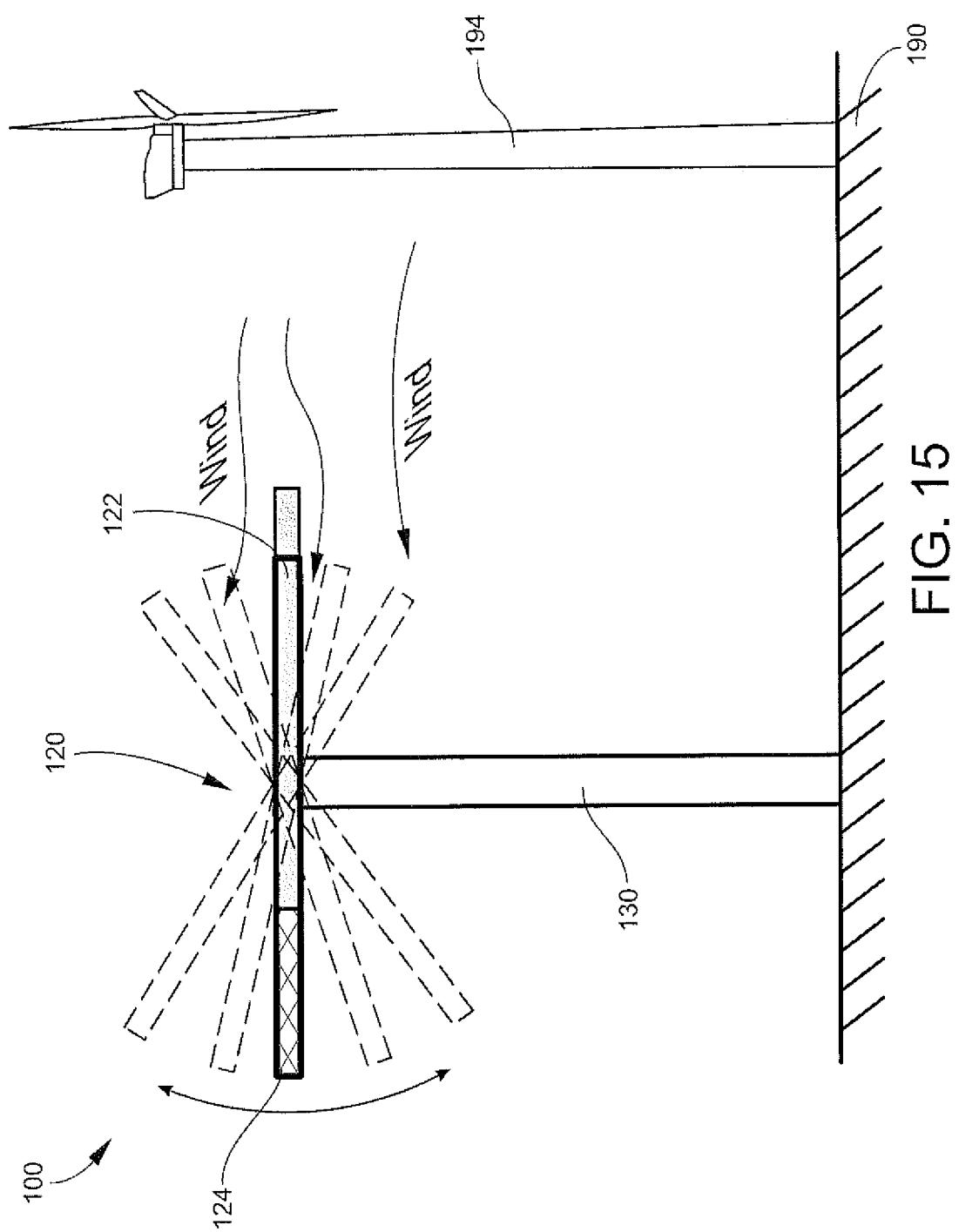
FIG. 15 is a side view of an embodiment of the apparatus having a hermetically sealed vessel filled with two fluids, pivoting atop a pole, and positioned downstream from a horizontal axis wind turbine.

FIG. 15 includes another embodiment of the invention 100, similar to that shown in FIGS. 10A-14B but positioned downstream from a horizontal axis wind turbine 194. Here, the hermetically sealed vessel 120 will pivot about the supporting structure 130 in response to laminar wind flow downstream from the wind turbine. The fluids 122, 124 located inside the vessel 120, will likewise flow within the vessel as the vessel 120 pivots in response to the air movement from the turbine. Preferably, the vessel 120 is positioned atop the supporting structure 130 such that it is biased in a resting position when there is no air movement. Wind/air movement will cause the vessel 120 to move and the vessel will return to the rest position in absence of wind/air movement. Accordingly, the invention defines a cycle of movement of the vessel 120 in response to air/wind movement wherein the fluids 122, 124 contained in the vessel 120 flow in response to such movement of the vessel 120.

Figure 16:
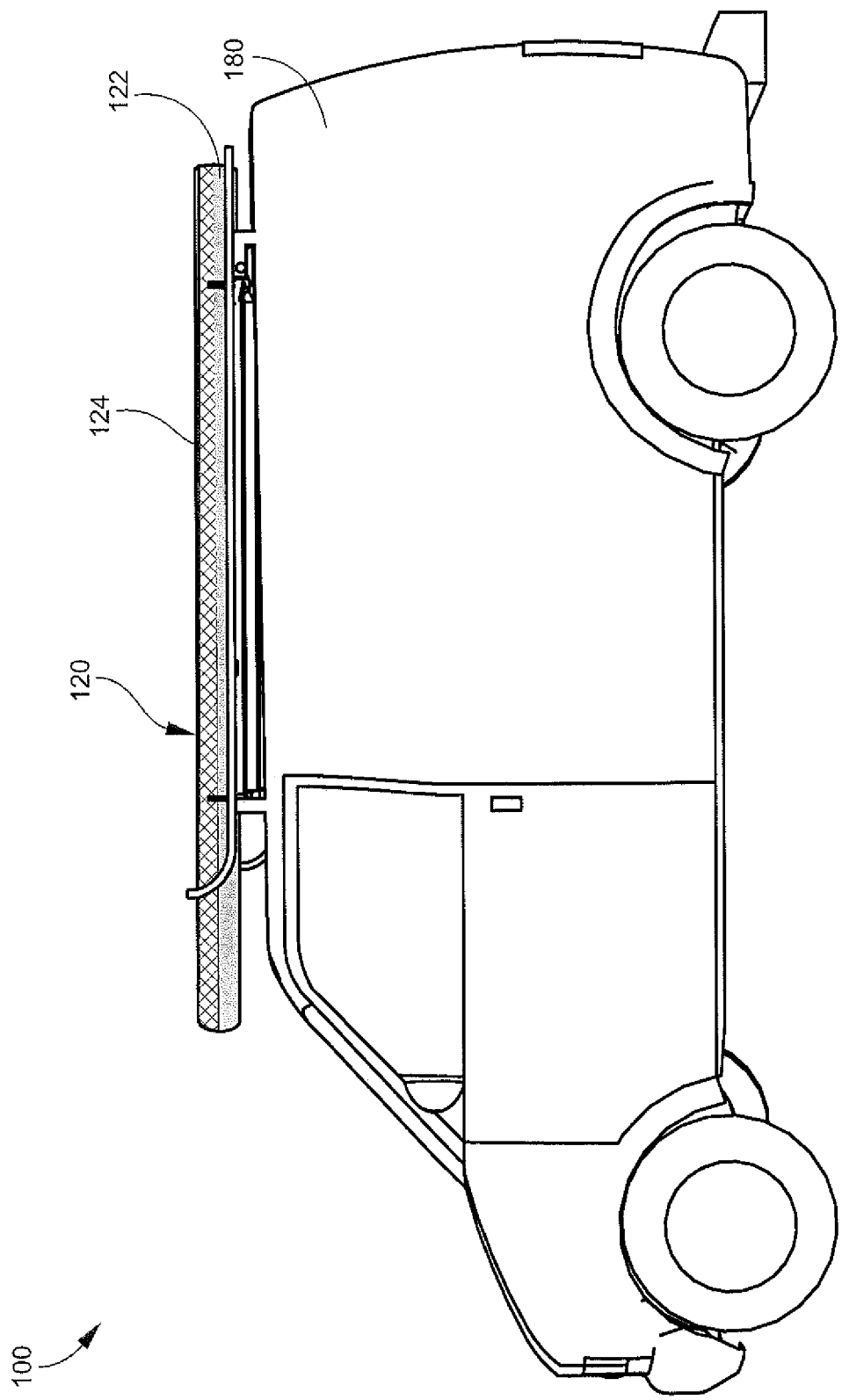
FIG. 16 is a side view of an embodiment of the apparatus having a hermetically sealed vessel filled with two fluids and attached to the top of a vehicle parallel to a path of forward travel of the vehicle.

FIG. 16 shows an embodiment of the invention 100 where the hermetically sealed vessel 120 is mounted atop a motor vehicle 180 which functions as the supporting structure. The vessel 120 contains two fluids 122, 124 which will flow as the vehicle 180 travels. As stated above, alternate embodiments may utilize a single fluid. As shown in FIG. 16, the vessel 120 may be attached to the vehicle 180 such that along a longitudinal axis of the vessel 120 is parallel to the direction of forward travel of the vehicle 180.

Figure 17A:
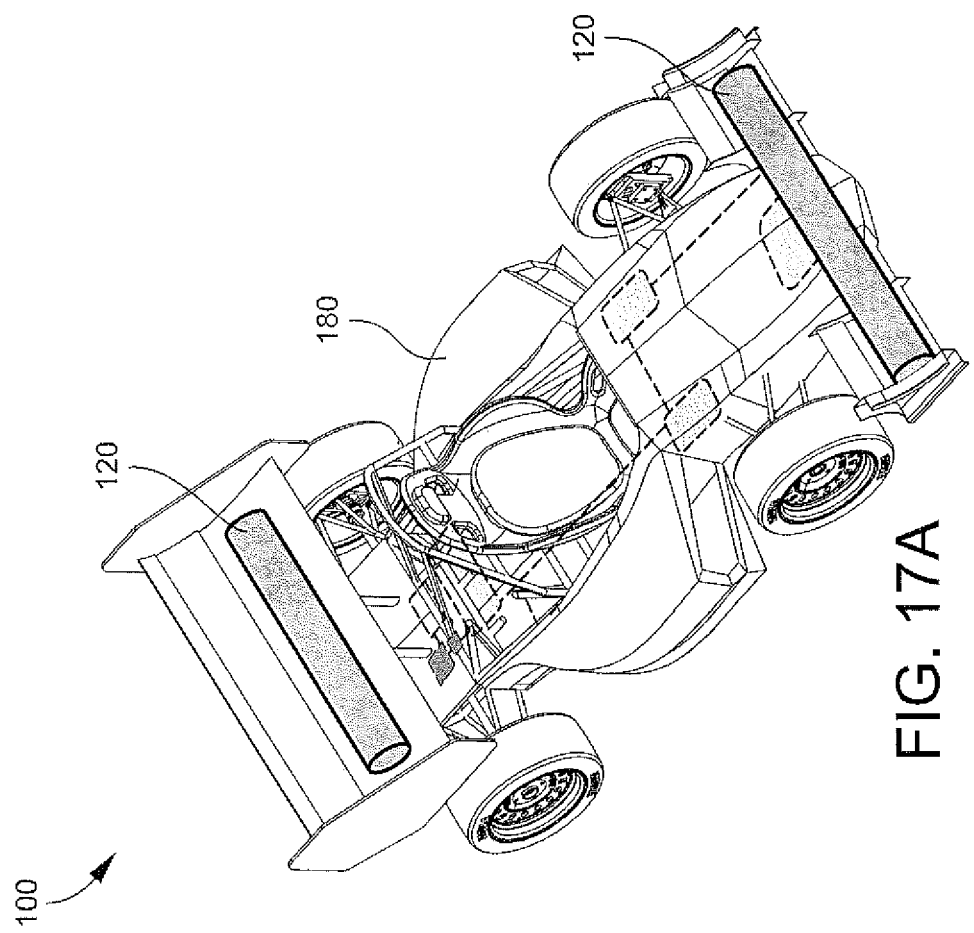

FIGS. 17A and 17B show an embodiment of the invention 100 where the hermetically sealed vessel 120 is attached to a vehicle 180. As shown in FIG. 17A, the vessel 120 may be arranged such that the longitudinal axis of the vessel 120 is perpendicular to a direction of forward travel of the vehicle 180. As shown in FIG. 17 B, the vessel 120 may be arranged such a plurality of vessels 120 are attached to the vehicle 180 with at least one vessel having its longitudinal axis parallel to the direction of forward travel of the vehicle 180 and one vessel having its longitudinal axis perpendicular to the direction of forward travel of the vehicle 180.

FIGS. 18 and 19 show an embodiment of the invention 100 where one or more vessels 120 are attached to one or more buoys 182 floating in a body of water 196. The buoys 182 will move as they float in the body of water 196. The vessels 120 are attached to the buoys 182 and, therefore will also move with the buoys 182.

FIG. 20 shows an embodiment of the invention 100 where one or more hermetically sealed vessels 120 are attached to or embedded within a floating vehicle 184 such as a ship or boat. Here, the vessel 120 could comprise a water tank, a sewage tank, an oil tank, a ballast tank, or any other such vessel capable of holding a fluid. As vehicle 184 moves through the water 196 in response to its own propulsion or in response to the environmental factors such as wind and water current (such as those found in lakes, rivers, and oceans) the hermetically sealed vessel 120 will move as will the fluids 122, 124.

FIG. 21 shows an embodiment of the invention 100 where the hermetically sealed vessel 120 is configured to capture energy of the working mass, comprising the fluids 122, 124, by utilizing one or more fluid flow generators 141. This embodiment may be deployed in any or all of the embodiments shown at least in FIGS. 8, 10A-20, and 23-24 B. Specifically, as the hermetically sealed vessel moves, whether in response to movement of the supporting structure or of the vessel itself, the fluids 122, 124 will move and flow inside the vessel. Preferably, the fluids 122, 124 do not mix or do not mix to a large extent such that they remain primarily separated. The fluids might be oil and water, air and water, or any other combination of fluids. Alternatively, a film, flexible divider, or other membrane (not shown) may be utilized to keep the fluids 122, 124 from mixing.

Each of the fluid flow generators 141 has an inlet 143 and an outlet 145. Preferably, the inlet of each of the generators, in embodiments where there are two or more generators, face different directions respective of the length or width of the vessel. In this way, the fluid 122 will flow through the inlet 143 of at least one generator 141 in response to movement of the vessel 120. As the fluid 122 flows through the fluid flow generators 141, the generator produces electric power. This power may be used to power on board components such as a computer in the case of a vehicle or buoy or the power may be supplied to an electric grid. Alternatively, the electricity produced by the fluid flow generators 141 may charge capacitors or batteries.

FIG. 22 shows an alternate embodiment from that of FIG. 21. This embodiment may be deployed in any or all of the embodiments shown at least in FIGS. 8, 10A-20, and 23-24 B. Here, in FIG. 22, rather than fluid flow, the working mass 150 is a wheeled cart which travels on a path or a track within the hermetically sealed vessel 120. Alternatively, the working mass might be a sliding mass rather than a wheeled cart. In such an embodiment, the sliding mass might have a cross-section such as a diameter which is slightly smaller than an inner diameter of the vessel 120. As the working mass 150 moves within the vessel 120, it will impact hydraulic cylinders 140 disposed at either end of the vessel 120. The impact of the working mass 150 on the hydraulic cylinders 140 will cause hydraulic fluid to move through a hydraulic generator 142. This movement of the hydraulic fluid through the hydraulic generator 142 will create an electric current. This current may be used to power on board components such as a computer in the case of a vehicle or buoy or the power may be supplied to an electric grid. Alternatively, the electricity produced by the fluid flow generators 141 may charge capacitors or batteries.

FIG. 23 shows an embodiment of the invention 100 as described above but further comprising a plurality of gears 166, 164, 162, and 160 attached to the vessel 120. These gears may be in the form of rack and pinion gears as shown in FIG. 23. The gears may facilitate the movement, pivot, and adjustment of the vessel so as to control and respond to pitch, roll, and yaw of the vessel 120.

FIGS. 24A and 24B show a further embodiment of the invention 100 where fluid filled bags operating from a filled state 170 as shown in FIG. 24A to a unfilled state 172 as shown in FIG. 24B operate in combination with the vessel 120. Here, the vessel 120 is biased in a direction which favors the unfilled state 172 of FIG. 24B. As the fluid bag is filled, the vessel 120 moves towards the fluid filled state 170 of FIG. 24A. This movement of the vessel 120 causes the working mass or fluids contained in the vessel to move and/or flow. The expansion of the fluid filled bags from the unfilled state 172 to the filled state 170 may be accomplished by using a compressor to fill the bags with air, oil, or another fluid. Alternatively, the bags may be filled with a fluid of constant mass which expands in response to changes in heat. That is, according to such an embodiment, the fluid filled bag may be covered with a dark color which absorbs heat from the sun. The fluid held by the bag has expansion properties such that the volume will significantly expand due to changes in temperature at atmospheric pressure of ground level Earth. Accordingly, as the bag heats, the fluid will expand the bag causing the vessel to move and thereby causing the fluid in the vessel to move. This movement of the fluid can be used to generate power as described above.

The foregoing has described an apparatus for generating power using the gravitational force of a falling mass contained by a vessel and also the force of a working mass or fluid housed in a hermetically sealed vessel. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. An apparatus for capturing energy of a working mass including two or more immiscible liquids having different densities, the apparatus comprising:
   the working mass comprising at least two immiscible liquids having different densities, the at least two immiscible liquids comprising a predetermined proportion of oil and water;
   a supporting structure;
   only a single hermetically sealed vessel having an elongate shape housing the working mass wherein the working mass moves within the hermetically sealed vessel, wherein the water having a greater density than the oil tends to settle in a lower portion of the hermetically sealed vessel than the oil, which tends to keep the water in the lower portion as the working mass moves; and
   an electric generator driven by fluid flow housed within the hermetically sealed vessel and having an inlet and an outlet, the electric generator driven by fluid flow configured to produce electric power as the predetermined portion of oil and water passes into the inlet and out of the outlet in response to a movement of the hermetically sealed vessel;
   wherein the electric generator driven by fluid flow comprises a plurality of electric generators driven by fluid flow.

2. The apparatus of claim 1 wherein the working mass consists of the predetermined proportion of oil and water.

3. The apparatus of claim 1 wherein the working mass consists of the predetermined proportion of oil and water and also an air void.

4. The apparatus of claim 1 wherein the supporting structure is a vertical support extending vertically upwards from a supporting surface.

5. The apparatus of claim 4 wherein the vertical support is attached via a spring to the supporting surface.

6. The apparatus of claim 4 wherein the hermetically sealed vessel is attached via a spring to the supporting structure.

7. The apparatus of claim 1 further comprising a planar wind-resisting surface attached to the hermetically sealed vessel.

8. The apparatus of claim 1 wherein the hermetically sealed vessel is attached to a moving vehicle.

9. The apparatus of claim 1 wherein the supporting structure is attached to a moving vehicle.

10. An apparatus for capturing energy of a working mass including two or more immiscible liquids having different densities, the apparatus comprising:

the working mass comprising at least two immiscible liquids having different densities, the at least two immiscible liquids comprising a predetermined proportion of oil and water; a supporting structure;

only a single hermetically sealed vessel having an elongate shape housing the working mass wherein the working mass moves within the hermetically sealed vessel, wherein the water having a greater density than the oil tends to settle in a lower portion of the hermetically sealed vessel than the oil, which tends to keep the water in the lower portion as the working mass moves; and an electric generator driven by fluid flow housed within the hermetically sealed vessel and having an inlet and an outlet, the electric generator driven by fluid flow configured to produce electric power as the predetermined portion of oil and water passes into the inlet and out of the outlet in response to a movement of the hermetically sealed vessel;

wherein the supporting structure is a vertical support extending vertically upwards from a supporting surface and attached via a spring to the supporting surface.

11. An apparatus for capturing energy of a working mass including two or more immiscible liquids having different densities, the apparatus comprising:

the working mass comprising at least two immiscible liquids having different densities, the at least two immiscible liquids comprising a predetermined proportion of oil and water; a supporting structure;

only a single hermetically sealed vessel having an elongate shape housing the working mass wherein the working mass moves within the hermetically sealed vessel, wherein the water having a greater density than the oil tends to settle in a lower portion of the hermetically sealed vessel than the oil, which tends to keep the water in the lower portion as the working mass moves; and an electric generator driven by fluid flow housed within the hermetically sealed vessel and having an inlet and an outlet, the electric generator driven by fluid flow configured to produce electric power as the predetermined portion of oil and water passes into the inlet and out of the outlet in response to a movement of the hermetically sealed vessel;

wherein the supporting structure is a vertical support extending vertically upwards from a supporting surface; and wherein the hermetically sealed vessel is attached via a spring to the supporting structure.

\* \* \* \* \*